US012744354B2

(12) United States Patent
Dobler

(10) Patent No.: US 12,744,354 B2
(45) Date of Patent: Sep. 22, 2026

(54) PLUG ASSEMBLY

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 590 days.

(21) Appl. No.: 18/034,974

(22) PCT Filed: Sep. 22, 2021

(86) PCT No.: PCT/EP2021/076046
§ 371 (c)(1),
(2) Date: Nov. 9, 2023

(87) PCT Pub. No.: WO2022/096190
PCT Pub. Date: May 12, 2022

(65) Prior Publication Data

US 2024/0128697 A1 Apr. 18, 2024

(30) Foreign Application Priority Data

Nov. 3, 2020 (AT) .............................. A 50947/2020

(51) Int. Cl.
*H01R 24/64* (2011.01)
*H01R 13/512* (2006.01)
*H01R 13/53* (2006.01)

(52) U.S. Cl.
CPC ........... *H01R 24/64* (2013.01); *H01R 13/512* (2013.01); *H01R 13/53* (2013.01)

(58) Field of Classification Search
CPC .... H01R 13/59; H01R 13/562; H01R 13/512; H01R 13/53; H01R 24/64
USPC ................................ 439/676, 447, 461, 462
See application file for complete search history.

(56) References Cited

U.S. PATENT DOCUMENTS

| | | | | |
|---|---|---|---|---|
| 6,508,669 | B2 * | 1/2003 | Wang | H01R 13/59 439/598 |
| 6,582,248 | B2 * | 6/2003 | Bachman | H01R 13/533 439/461 |
| 6,814,601 | B2 * | 11/2004 | Lin | H01R 13/59 439/321 |
| 9,768,529 | B2 * | 9/2017 | Starke | H01R 13/512 |
| 10,116,083 | B2 * | 10/2018 | Lin | H01R 13/582 |
| 10,553,990 | B2 * | 2/2020 | Grimm | H01R 13/5845 |
| 11,515,661 | B2 * | 11/2022 | Zechmann | H01R 13/5825 |

(Continued)

FOREIGN PATENT DOCUMENTS

| | | |
|---|---|---|
| AT | 521108 | 10/2019 |
| CN | 201805068 | 4/2011 |

(Continued)

*Primary Examiner* — Gary F Paumen
(74) *Attorney, Agent, or Firm* — Volpe Koenig

(57) ABSTRACT

A plug assembly for use with cables (K) with cable plugs (S), in particular for data cables such as RJ45 cables, waveguides, power cables, and the like. The front section of a housing (1) surrounds the cable plug (S). The housing (1) or a clamping part (5) is equipped with a stop for the cable plug (S) in order to position the cable plug (S) at least in the longitudinal axial direction of the housing (1). A specified distance is formed in the contact region of the cable plug (S) and/or between the housing (1) and the cable plug (S) as a movement clearance for at least one section of the cable plug (S) in at least one direction transversely to the longitudinal axial direction of the housing (1).

19 Claims, 14 Drawing Sheets

(56) References Cited

U.S. PATENT DOCUMENTS

| | | | | |
|---|---|---|---|---|
| 2003/0100215 | A1 * | 5/2003 | Bachman | H01R 13/59 |
| | | | | 439/462 |
| 2017/0133773 | A1 * | 5/2017 | Starke | H01R 9/0527 |

FOREIGN PATENT DOCUMENTS

| | | |
|---|---|---|
| CN | 202495629 U | 10/2012 |
| CN | 103326179 | 9/2013 |
| CN | 204030082 | 12/2014 |
| EP | 1317025 | 3/2008 |
| WO | 2011066339 | 6/2011 |
| WO | 2019192753 | 10/2019 |

* cited by examiner

PLUG ASSEMBLY

TECHNICAL FIELD

The invention relates to a plug assembly for use with cables with cable plugs, in particular for data cables such as RJ45 cables, light guides, power cables and the like, and to a plug-in connection using a plug assembly of this type.

BACKGROUND

The transmission of electronic data between computing systems via cables is generally known. These cables conventionally have a plug or plug-in connector having a plurality of poles and the configuration of which resembles a rectangular telephone plug. An eight-pole plug used in many cases is known in expert circles as an "RJ-45" plug. In some applications, the standardized RJ-45 plug is susceptible to damage and failure. For example, it is not readily suitable for repeated plugging into and unplugging from in particular a chassis plug socket; contacts become easily bent or displaced by being wrongly inserted. The plastics latch (spring arm) can suffer fatigue and break off, and therefore the plug then no longer sits firmly in the socket. The cable itself is prone to malfunction by being repeatedly kinked at the point at which the cable enters the plug socket. Furthermore, the cable can also be torn out of the plug by longitudinal loading. The plug housing is formed from plastic and is easily deformed or broken if, for example, it is inadvertently stepped upon. The disadvantages mentioned also relate to other cable connections such as, for example, fiber optic cables, power cables and many others.

An arrangement according to EP 1 317 025 B1 has therefore been proposed as a protector for the sensitive cable plugs. Furthermore, a cable plug protector for preassembled RJ45 cable plugs is sold by NEUTRIK AG under the name NE8MC and consists of a housing, a stop disk, a clamping part, a clamping sleeve and a kink protector. A housing for receiving the actual cable plug has an external thread in order, together with a clamping socket or union nut or clamping nut having an internal thread, to form a threaded connection. A radially compressible clamping part which engages around the cable and, in the compressed state, clamps the cable in the housing is received in the interior of the housing and partially with the clamping sleeve. When the threaded connection is tightened, the clamping sleeve, the clamping part, the housing, the cable plug and the cable are braced together and the clamping sleeve, clamping part, cable plug and housing form a plug assembly which can be connected to a complementary element, such as a plug socket, by plugging them together. Depending on the specific type of design of the cable plug, additional adapter pieces, which are adapted to the respective plugs, furthermore have to be inserted between the front end of the collet and the cable plug, which increases the assembly time and the outlay on assembly in a disadvantageous way. Furthermore, adapter pieces suitable for any type of cable plug have to be kept ready.

A collet with fingers projecting away forward for positioning a data plug is also disclosed in CN 204030082 U. One of these fingers also serves for holding down the locking tongue of the data plug. However, the fingers of this embodiment are not configured for receiving and correctly positioning data plugs of different sizes in the longitudinal direction too. Furthermore, the collet cannot be used for preassembled cables since it has to be pushed from the front onto the cable, only after which the plug can be fitted to the cable. Also, a recess is not provided in the housing for receiving the locking tongue.

The fingers of the collet disclosed in CN 201805068 U also do not permit data plugs of different sizes to be securely and correctly positioned.

By contrast, it is disclosed in CN 204030082 U that the front, which faces the cable plug, of a clamping part for receiving and positioning the cable plug in a predetermined position—both about the longitudinal axis of the plug assembly and in the longitudinal direction thereof—is formed at the front end of the clamping part or is provided with at least one stop for the cable plug. When the threaded connection is tightened, the cable plug is positioned in a rotationally secure manner in relation to the housing and the clamping part and is preferably also fixed at a defined position in the direction of the longitudinal axis. At least one cross-sectional constriction as a stop for the front and of the clamping part in the direction of the longitudinal axis is arranged in the interior of the housing, and therefore, at least when the threaded connection is tightened, the clamping part is supported on the cross-sectional constriction in the direction of the longitudinal axis and is positioned precisely in the direction of the longitudinal axis of the housing. At least when the threaded connection is tightened, the clamping part is clamped between the cross-sectional constriction and the clamping sleeve or an element interacting therewith and is precisely positioned in the direction of the longitudinal axis of the housing.

In a similar way, CN 103326179 A discloses a clamping part, the front side of which forms a stop for the cable plug and keeps the latter also fixed in a predetermined position about the longitudinal axis of the plug assembly. However, the protective housing consists here of two partial elements which are plugged together. When the threaded connection is tightened, the cable plug is positioned in a rotationally secure manner in relation to the housing and the clamping part and is preferably also fixed at a defined position in the direction of the longitudinal axis. Formed on the housing is a cross-sectional constriction as a stop for a shoulder on the cable plug, against which the clamping part is supported, at least when the threaded connection is tightened, and is therefore also precisely positioned in the direction of the longitudinal axis. At least when the threaded connection is tightened, the clamping part is clamped between the cross-sectional constriction and the clamping sleeve or an element interacting therewith. It has reinforcing ridges running in the longitudinal direction on its outer side.

WO 2019192753 A1 discloses a simply constructed device, which can be rapidly fitted, for protecting a cable plug, which device can avoid or reduce the risk of damage when plugging it into a corresponding plug socket and when pulling it out of the plug socket. This plug assembly comprises a housing for receiving the cable plug, a clamping part for clamping the cable, and a clamping sleeve for forming a threaded connection with the housing. When the threaded connection is tightened, the clamping sleeve, the clamping part, the housing and the cable are braced together. The front end of the clamping part is designed as a receptacle or stop for the cable plug and as a stop for a partition of the housing, wherein, when the threaded connection is tightened, the cable plug is positioned and fixed in a rotationally secure manner in relation to the housing and the clamping part and/or in the direction of the longitudinal axis. Preferably, at least one guide, which runs parallel to the direction of the longitudinal axis, for the clamping part is arranged in the interior of the housing. This guide interacts with a complementary structure on the clamping part or on the cable plug itself.

SUMMARY

The invention has been set the object of providing a simply constructed device, which can be fitted rapidly, for protecting a cable plug of no matter what type and for any type of cable, by means of which device the risk of damage as it is being plugged into a corresponding plug socket, while it is inserted in the plug socket and on pulling out of the plug socket can be avoided or reduced, in particular during frequent use.

This object is achieved by a device having one or more of the features disclosed herein. Further features of the invention can be gathered from the claims, the description and the drawings.

The plug assembly according to the invention is characterized in that at least one portion of the cable plug is held in said plug assembly so as to be movable by a predetermined distance. Preferably, for this purpose, a predetermined distance as a movement clearance is kept free in the contact region between clamping sleeve and cable plug and/or between housing, preferably stop, and cable plug. Simple, rapid, precise and nevertheless secure positioning and also fixing of the cable plug is therefore ensured, and said cable plug can nevertheless easily be inserted into the front end of the clamping part.

Instead of a cable plug, i.e. a component which is usable independently without a further auxiliary component, it could also be possible just to use a contact carrier which, designed as an insulating component, carries the contacts fixed in a defined arrangement. In a further sequence, for the sake of simplicity, the term cable plug is used both for cable plugs in the actual sense and also for contact carriers. Even if cable plug or contact carrier and complementary socket are not completely in alignment, the possibility of tilting and/or displacing the cable plug or contact carrier in a direction transversely with respect to the longitudinal axis of the housing ensures a simple, gentle and easy pushing together and plugging in of the plug-in connection. Even in the event of frequent plugging in and unplugging, the mechanical loadings on cable plug, cable carrier and socket are small, and therefore malfunctions or damage of said components can be avoided.

A further advantageous embodiment of the invention provides a radially compressible clamping part which engages around the cable and is received in the housing and, in the compressed state, clamps the cable. Said clamping part forms the contact region here between clamping sleeve and cable plug. When a connection is produced between housing and clamping sleeve, said clamping sleeve, the clamping part, the housing and the cable are braced together. The cable plug is held movably by a predetermined distance in at least one direction transversely with respect to the direction of the longitudinal axis of the housing, which is preferably brought about by a corresponding design of the contact region between clamping part and cable plug and/or between stop and cable plug.

Advantageously, a plurality of protrusions at the front end of the clamping part, which protrusions are distributed circumferentially around the central longitudinal axis and are oriented parallel thereto, are arranged as a receptable or stop for the cable plug. The distances of said protrusions from one another in at least one direction transversely with respect to the direction of the longitudinal axis of the clamping part is preferably greater by a predetermined distance than the size of the cable plug in said direction in order to permit the required small amount of movability of the cable plug in at least one direction transversely with respect to the direction of the longitudinal axis of the housing. Another possibility of ensuring this movability makes provision for the protrusions to be elastically deflectable slightly, i.e. by a small angle, from their normal position, i.e. parallel to the longitudinal center axis.

Preferably, at least one shoulder is formed laterally in the circumferential direction—with respect to the direction of longitudinal axis of the plug assembly—on at least one of the protrusions as a receptacle or stop for the cable plug. At the latest when the threaded connection is tightened, the rear end of the cable plug lies against at least one of the shoulders or, alternatively thereto, is received between the protrusions and therefore securely positioned. At any rate, a different size of the receiving region for the cable plug can be provided via the position and depth of the shoulders, preferably a plurality of shoulders arranged in step form, in combination with a different rotational position of the clamping part about the cable longitudinal axis. A clamping part configured in such a way and a plug assembly containing said clamping part is therefore suitable for receiving cable plugs of different dimensions, with the exact and secure positioning within the housing of the plug assembly being guaranteed for all types of cable plugs.

According to an advantageous further embodiment of the plug assembly according to the invention, a radially inwardly protruding ridge is formed on at least one of the protrusions. Increased stability of the clamping part and in particular of the protrusions can be achieved via said ridges.

Preferably, furthermore, at least one of the protrusions is positioned and dimensioned in such a manner that a possible spring arm of the cable plug is held by said protrusion in a position pressed toward the housing of the cable plug. The spring arm therefore does not prevent the coupling, brought about solely by the plug assembly, and latching of the plug-in connection and also does not have to be removed manually in an additional, complicated working step with the risk of damaging the cable plug.

A simply producible and robust embodiment of the clamping part is characterized in that the clamping part has a cylindrical central part adjoining the protrusions of the front end and a preferably conically tapering rear end opposite the protrusions.

In order to ensure the tension relief in the best possible way, the conically tapering rear end of the clamping part preferably has at least two radially compressible extensions, the surfaces of which facing the cable are configured for an increased form fit or frictional fit with the cable.

A further embodiment according to the invention of the invention is characterized by a pierced partition, which is provided with a recess for the front portion of the cable plug, in the housing as a stop for the cable plug and/or the front end of the clamping part, and by an intermediate space of a predetermined size between the inner boundary of the recess in the partition and the cable plug.

Preferably, at least one guide for the clamping part and/or the cable plug is provided, which guide is arranged in the interior of the housing behind the stop or the partition and runs parallel to the direction of the longitudinal axis of the housing. Said guide interacts with a complementary structure on the clamping part, on the cable plug or with the cable plug itself, the guide and/or the guide structure being designed to permit a small amount of movability of the cable plug in at least one direction transversely with respect to the direction of the longitudinal axis of the housing. An even more rapid and simpler assembly with optimum fixing and positioning of the cable plug in the assembled state of the plug assembly is therefore ensured.

Preferably, one embodiment of such a guide for the clamping part and the complementary structure on the clamping part is designed as a ridge running parallel to the direction of the longitudinal axis of the housing and as a groove running parallel to the direction of the longitudinal axis of the housing. In order, with as simple and functionally reliable means as possible, to ensure the security of the clamping part against rotation in the housing and nevertheless to obtain simple longitudinal displaceability, according to a further optional invention feature at least one guide for the clamping part, which guide runs parallel to the direction of the longitudinal axis, is arranged in the interior of the housing. Said guide advantageously interacts with a complementary structure on the clamping part, at any rate also with the cable plug itself, in particular with its side edges, and thus leads to the desired longitudinal guidance without rotation of the clamping part.

A further variant of the plug assembly according to the invention is characterized in that the clamping part has an axially parallel longitudinal slot passing through the length of the clamping part, the clamping part being able to be elastically pulled apart in its circumferential direction and pushed onto the cable.

Also suitable for achieving the object set at the beginning is a plug assembly which has a housing for protected receiving of the cable plug, wherein a front portion of the housing surrounds the front portion of the cable plug at a distance. A kink protector is connected to the rear portion of the housing. A cable plug fastened to the cable is received in the front portion of the housing. The cable is clamped by a radially compressible clamping part which engages around the cable and is received in the housing, while a front end facing the cable plug is designed for receiving and positioning the cable plug in a predetermined position or is provided with at least one stop for the cable plug.

This further embodiment of the plug assembly is characterized according to the invention in that the cable plug is held in the clamping part so as to be movable by a predetermined distance in at least one direction transversely with respect to the direction of the longitudinal axis of the housing. The contact region between clamping part and cable plug is preferably configured in order to permit a small amount of movability of at least one portion of the cable plug in at least one direction transversely with respect to the direction of the longitudinal axis of the housing.

The same inventive concept brings about the alternative embodiment, in which a distance of a predetermined extent is formed between the outer side of the clamping part and the inside of the housing, and at least the front end of the clamping part is held so as to be movable in at least one direction transversely with respect to the direction of the longitudinal axis of the housing. Preferably, the front end of the clamping part is arranged so as to be elastically restorable by said distance. Simple, rapid, precise and nevertheless secure positioning and also fixing of the cable plug is ensured, and the cable plug can nevertheless easily be inserted into the front end of the clamping part. Also in this embodiment, the term “cable plug” is a collective term for separately usable cable plugs and for contact carriers which are conventionally not used independently.

Preferably, a plug arrangement of this type is characterized by a clamping sleeve which is connectable to the clamping part, preferably to the rear end thereof, preferably by means of a threaded connection in order to radially compress said clamping part.

In order to be able to attach the clamping part to the cable rapidly and without great effort, the clamping part is divided according to the invention in the longitudinal direction into two half shells which are linked pivotably at the front end and at the rear end have an external thread for connection to an internal thread of a clamping sleeve.

The plug assembly is preferably characterized by a cross-sectional constriction on the inside of the housing for the cable plug or the clamping part. Said cross-sectional constriction limits the movability of the cable plug or of the clamping part rearward and thereby permits the entire plug assembly to be connected to a complementary plug assembly, preferably to be inserted therein, by handling just the housing. A front shoulder of the cable plug or of the clamping part preferably lies against the abovementioned stop of the housing.

Advantageously, a highly stable plug assembly is achieved by an embodiment in which a pierced partition, which is provided with a recess for the front portion of the cable plug or of the clamping part, is arranged in the housing as a stop for the cable plug and/or the front end of the clamping part. In order nevertheless to ensure a movability of the cable plug permitting small alignment errors of the plug-in connectors or manufacturing tolerances to be compensated for, an intermediate space of predetermined size is provided between the inner boundary of the recess in the partition and the cable plug or the clamping part.

An advantageous embodiment according to the invention is characterized by a latching connection between the cable plug or the clamping part and the housing. Said latching connection is preferably arranged in the front portion of the housing.

A latching connection of this type of a plug assembly is preferably characterized by a rearwardly directed step on the inside of the housing, a transverse ridge, which is configured in a complementary manner thereto and, in a latched position, is arranged behind the shoulder, on the cable plug or on the clamping part, and a spring element for exerting a predetermined force on the cable plug or the clamping part for the mutual engagement of shoulder and transverse ridge. At any rate, the spring element can be designed flexibly and/or restorably, and it acts upon the cable plug or the clamping part with a force in order to hold step and transverse ridge in a latched position.

A further embodiment according to the invention of a plug assembly is characterized by a kink protector, the rear end of which surrounding the cable is elastic and has a smaller inside diameter than the cable. The unit of housing and kink protector can therefore be displaced along the cable and remains fixed at any desired position.

An embodiment with a kink protector with an elastic front portion which encloses the rear portion of the housing in a form-fitting and/or force-fitting manner permits rapid and simple assembly of the housing/kink protector unit.

Preferably, a plug assembly according to one of the preceding paragraphs is also characterized by at least one guide for the clamping part and/or the cable plug, which guide is arranged in the interior of the housing behind the stop or the partition and runs parallel to the direction of the longitudinal axis of the housing. Said guide interacts with a complementary structure on the clamping part on the cable plug or with the cable plug itself, the guide and/or the guide structure being designed in order to permit a small amount of movability of the clamping part in at least one direction transversely with respect to the direction of the longitudinal axis of the housing.

The guide for the clamping part and the complementary structure on the clamping part are preferably designed as a ridge running parallel to the direction of the longitudinal axis of the housing and as a groove running parallel to the direction of the longitudinal axis of the housing.

Also suitable for achieving the object set at the beginning is a plug assembly which comprises a housing which surrounds at least the front portion of the contact carrier at a distance, and at least one connection portion between contact carrier and housing.

A plug assembly of this type which is preferably constructed as a chassis socket is characterized according to the invention in that the connecting portion between contact carrier and housing is designed to be at least deformable, preferably elastically deformable and automatically restorable, and in that at least a front portion of the contact carrier is designed to be adjustable in at least one direction transversely with respect to the direction of the longitudinal axis of the housing and to be restorable into a normal position.

The chassis socket according to the invention is therefore designed so as to permit a small amount of movability at least of the front portion of the contact carrier in at least one direction transversely with respect to the direction of the longitudinal axis of the housing. Even when the contact carrier of the chassis socket and of the cable plug or the contact carrier of a complementary cable plug is not completely aligned, the possibility of tilting and/or displacing the contact carrier in a direction transversely with respect to the longitudinal axis of the housing ensures simple, gentle and easy pushing together and plugging in of the plug-in connection. Even during frequent plugging-in and unplugging, the mechanical loadings on cable plug, cable carrier and socket remain small, and therefore malfunctions or damage of said components can be avoided.

A plug-in connection according to the invention for cables with cable plugs, in particular for data cables such as RJ45 cables, light guides, power cables and the like, to achieve the object mentioned at the beginning is characterized by a plug assembly according to one of the preceding paragraphs.

An advantageous embodiment of such a plug-in connection is characterized in that the housing and the plug socket are provided with complementary structures for longitudinal guidance of the housing in the plug socket in order to ensure the plug assembly is aligned with the plug socket when the plug assembly is pushed into the socket. Preferably, for this purpose, the housing is provided with a longitudinal groove and the plug socket is provided with a corresponding mating longitudinal rib.

Advantageously, in addition a snap latch for releasably connecting the plug assembly to the plug socket is provided, the snap latch engaging in a depression on the outside of the housing in order to reliably avoid the inadvertent pulling off of the cable plug.

A further embodiment according to the invention of the plug assembly is characterized in that furthermore a recess is provided in the housing for receiving a possible spring arm of the cable plug and/or a protrusion of a clamping part, the spring arm optionally being held in a pressed position in the recess.

To achieve the object set at the beginning, a plug-in connection is also provided using a plug assembly according to one of the preceding paragraphs.

A preferred embodiment according to the invention makes provision for the housing and the plug socket to be provided with complementary structures for longitudinal guidance of the housing in the plug socket in order to ensure that the plug assembly is aligned with respect to the plug socket when the plug assembly is pushed into the socket.

The housing is preferably provided with a longitudinal groove and the plug socket is provided with a corresponding mating longitudinal rib in order to ensure that the plug assembly is aligned with respect to the plug socket when the plug assembly is pushed into the socket.

BRIEF DESCRIPTION OF THE DRAWINGS

For the purpose of better understanding the invention, the latter will be explained in more detail with reference to the following figures.

In the figures, in each case in a highly simplified and schematic illustration.

DETAILED DESCRIPTION

Figure 1:
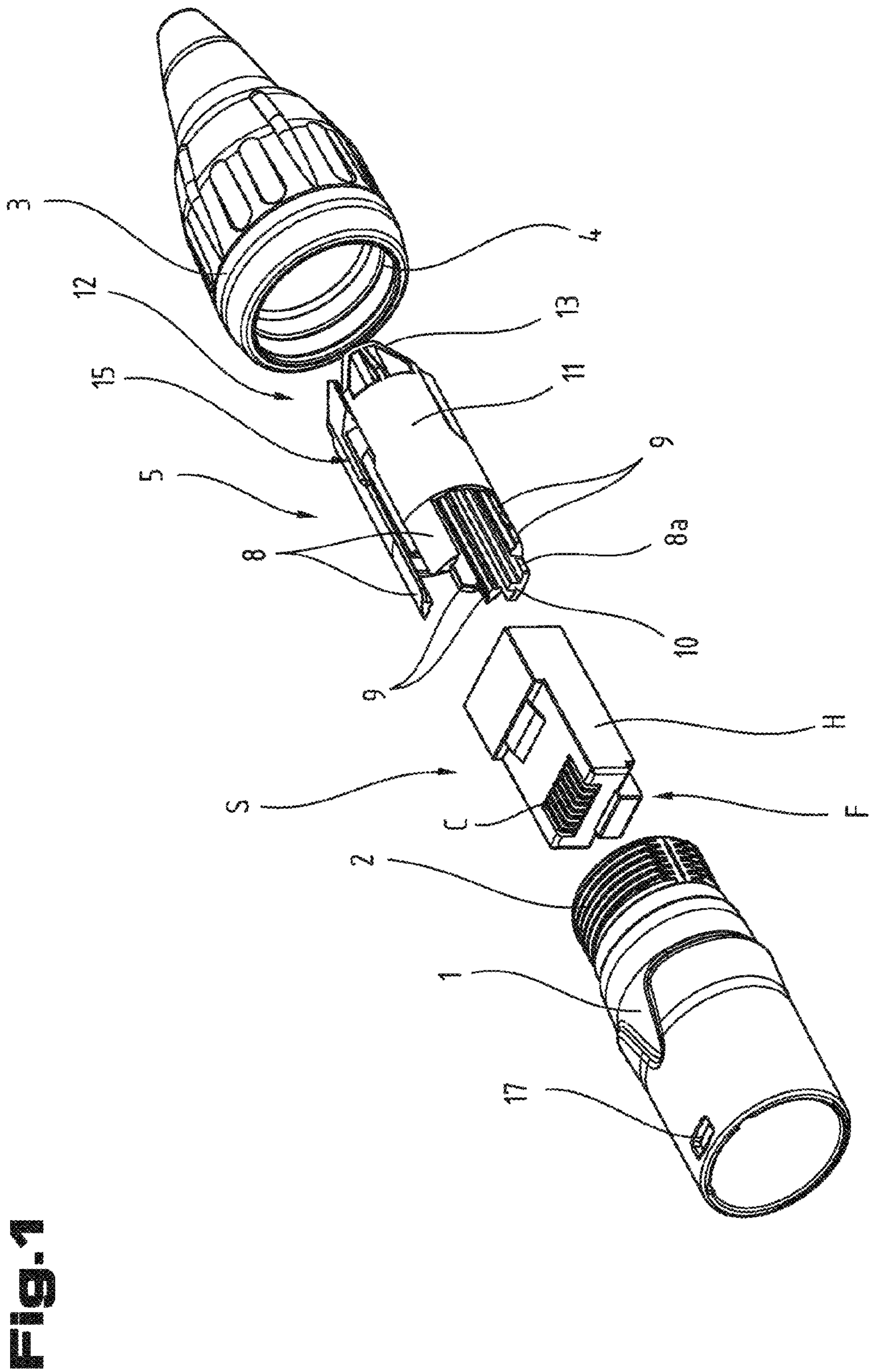
FIG. 1 shows an exploded illustration of a plug assembly according to the invention in the form of a cable plug of a first embodiment.

To begin with, it should be stated that, in the variously described embodiments, parts that are the same are provided with the same reference signs, or the same component designations, it being possible to transfer the disclosures present throughout the description analogously to the same parts with the same reference signs, or the same component designations. The positional indications chosen in the description, such as, for example, top, bottom, to the side, etc., refer to the figure being directly described and illustrated, and, when there is a change of position, these positional indications can also be transferred analogously to the new position.

The plug assembly according to the invention can be used for all types of cable plugs and cables, in particular for data cables and RJ45 cable plugs, but also for light guides and their correspondingly designed plug-in connections, for power cables and many more. Instead of cable plugs with a plurality of contact elements, use can also be made of individual contacts. The diameter of an enveloping circle surrounding the outer circumference of the preferably cylindrical part of the housing for a contact element, such as a cable plug, contact carrier or the like, is between 110 and 180%, preferably 120 to 150% of the enveloping circle diameter of the contact element itself, such as, for example, an RJ plug with a width of between 7 and 11 mm, such as RJ45, RJ21 or RJ11 or an XLR plug, or power twist plug, measured in a plane oriented perpendicularly to its longitudinal axis. The inside diameter or enveloping circle diameter of the preferably cylindrical part of the housing for a contact element can have values between 10 mm and 30 mm. The wall thickness of the housings can be between 1 mm and 4 mm.

The invention will be explained below with reference to exemplary embodiments for data cables with RJ45 cable plugs, but it should not be considered to be restricted thereto.

Figure 2:
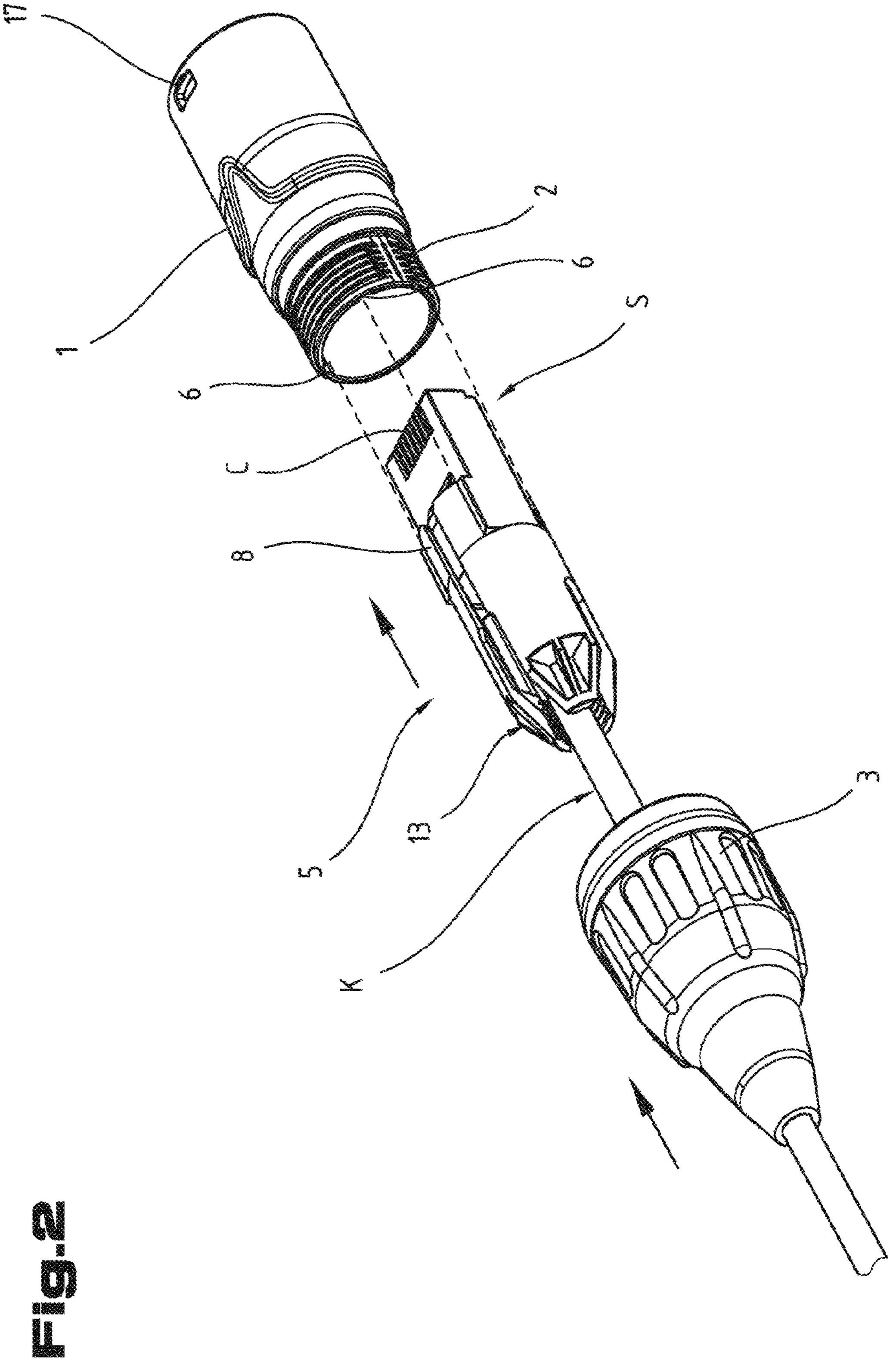
FIG. 2 shows the plug assembly of FIG. 1 in an exploded illustration, with a cable, from a different viewing angle.

The plug assembly according to the invention that is illustrated in FIG. 1 and FIG. 2 consists of a housing 1 which is configured for plugging into a plug socket and of which at least the portion which is provided for plugging in is preferably of circular configuration, as seen in cross section, and the rear end thereof is provided with an external thread 2 as a preferred example of a connecting structure. The housing 1 is preferably produced from diecast metal, in particular diecast zinc preferably having a coating, in particular of nickel or chromium. Housings 1 made from plastic or natural materials are also possible.

In the assembled state of the plug assembly, the cable plug S is received and fixed in the interior of said housing 1. Instead of a cable plug, i.e. a component which is usable independently without a further auxiliary component, use could also be made just of a contact carrier which, designed as an insulating component, carries the contacts fixed in a defined arrangement and therefore permits it to be plugged into a complementary socket with mating contacts. From the rear, i.e. from the cable side, opposite the plug-in side of the plug assembly, a clamping sleeve 3 can preferably be screwed onto the housing 1 and a threaded connection formed therewith. Of course, other connecting structures which are formed in a complementary manner to the connecting structure on the housing 1 and are designed to form a preferably releasable connection to the housing 1, for example bayonet connections, are also conceivable. An internal thread 4 is arranged as a complementary connecting element at the front end of the clamping sleeve 3 facing the housing 1. At the latest as soon as said threaded connection or connection of any type is formed, cable plug S, housing 1 and clamping sleeve 3 are braced together.

As can be seen in FIG. 1 and FIG. 2, in the case of the illustrated advantageous embodiment of a plug assembly according to the invention, a clamping part 5 is inserted within the preferably cylindrical housing 1, which is open on both sides, and the preferably conically rearwardly tapering clamping sleeve 3, but said clamping part, according to the invention, at the front end facing the housing 1 is already itself configured for receiving and positioning an independently usable cable plug or a contact carrier S, which is provided only for use together with housings and preferably has a spring arm F—the cable is not shown here for the sake of clarity of the illustration—in a predetermined position within the housing 1.

Figure 4:
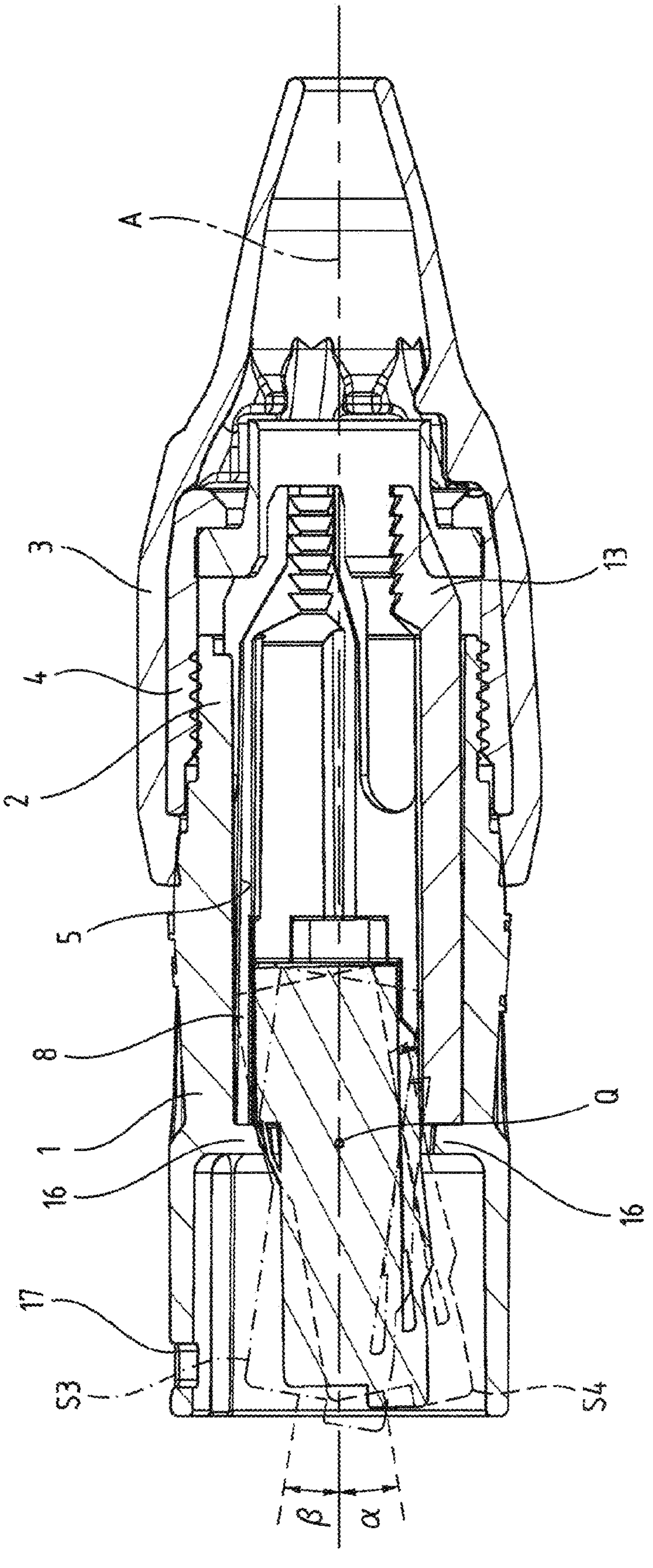
FIG. 4 shows the plug assembly of FIG. 1 in vertical longitudinal section, with the cable plug in various tilting positions.

The clamping part 5, preferably produced from polyacetal (POM) or else polyamide (PA), is rotatable freely about the central cable axis for as long as it is located outside the housing 1 and the threaded connection between housing 1 and clamping sleeve 3—in FIG. 4 a cross section of the plug assembly of FIGS. 1 and 2 consisting of housing 1, clamping sleeve 3 and clamping part 5 is illustrated in longitudinal sections—has not yet been produced. Said clamping part can thereby be attached to the cable in any position during the assembly of the plug assembly. Only after being inserted into the housing 1 is the clamping part 5 held therein via guide structures explained below and therefore the cable plug is also positioned in relation to the housing 1 and held in a normal position, both in directions perpendicularly to the longitudinal center axis of the housing 1 and with respect to rotation in the circumferential direction. No absolutely fixed positioning is provided via the structural embodiment explained further below, but rather the clamping part is elastically adjustable and restorable to low predeterminable distances preferably from the normal position both in the longitudinal direction of the longitudinal center axis A and radially thereto and/or in any desired rotational positions.

In the case of similarly known embodiments of the clamping part 5, the latter has protrusions 8, 8*a* in order to receive and to hold the cable plug or contact carrier S between them. The protrusions 8, 8*a* can be designed here as long and narrow arms or fingers, but can also be tabs or tongues which are widened in the circumferential direction. Furthermore, the clamping part 5 has, similarly to the known elements, a cylindrical central part 11 adjoining the protrusions 8, 8*a* of the front end and a preferably conically tapering rear end 12 opposite the protrusions 8, 8*a*.

The rear end 12 of the clamping part 5 in turn has at least two radially compressible extensions 13, the surfaces of which facing the cable K are configured for an increased form fit or frictional fit with the cable K. For example, said surfaces can be profiled in the manner of serrations, and therefore, when the extensions 30 are compressed during the tightening of the threaded connection between housing 1 and clamping sleeve 3, the points of the serrations press into the plastic sheath of the cable and thereby bring about the clamping between cable K and clamping part 5. As a result, tensile stresses of the cable K are separated from the cable plug S and instead are transmitted further via the clamping part 5 to the housing 1 and are received by the latter or by the plug-in connection between housing 1 and corresponding plug socket.

The clamping part 5 can be of multi-part design or preferably also single-part design and, in order to be able to attach it simply and rapidly to the cable, has a longitudinal slot 15 passing through the length of the clamping part 5. Said longitudinal slot provides the possibility of pulling apart the clamping part 5 in the circumferential direction, after which it can then be easily pushed onto the cable K. Advantageously, a longitudinal ridge which projects from the inner wall of the plug housing 1 and runs parallel to the longitudinal axis of the latter engages in the groove formed between the two longitudinal sides of the slot 15 of the clamping part 5. The longitudinal groove of the clamping part 5 and the longitudinal ridge can interact and form a guide or means of protection against rotation and can bring about the exact alignment of the clamping sleeve in the circumferential direction of the plug housing.

However, the clamping part 5 can also be completely closed in the circumferential direction and is then pushed onto the cable K in the longitudinal direction thereof before the cable plug S is attached. For the rotationally secure guidance, corresponding structures can be formed on the clamping part 5 and in the housing 1, for example a longitudinal groove not penetrating the entire material thickness of the clamping part 5 or protrusions arranged aligned in the direction of the longitudinal axis in or on the clamping part 5 for receiving a longitudinal rib in the housing 1 or for engagement in a longitudinal groove in the housing 1 so that the securing of the clamping part 5 against rotation in the housing 1 is ensured. This can also be achieved by a guide of the cable plug or contact carrier S in the housing 1.

When the plug assembly according to the invention is assembled, first of all the clamping sleeve 3 is pushed over the end of the cable with the cable plug. The clamping part 5 can then be attached to the cable, with the cable being guided through the longitudinal slot 5 toward the longitudinal center axis of the clamping part 5. The clamping part 5 is then pushed forward onto the cable plug which thereby comes to lie between the protrusions 8 and is supported by the shoulders 9 thereof. The entire arrangement of cable, cable plug and clamping part 5 is then pushed into the housing 1.

In the plug assembly assembled ready for operation, as can also be seen in FIG. 4, the clamping sleeve 3 is screwed onto the housing 1 so that the threaded connection is produced between the external thread 2 of the housing 1 and the internal thread 4 of the clamping sleeve 3. As a result, on the one hand, the rear extensions 13 of the clamping part 5 are pressed onto the cable K and therefore the clamping part 5 is clamped to the cable K. At the same time, the clamping part 5 is brought as a result to a stop by its protrusions 8 and possibly also 8*a* with the partition 16 or to a stop present in a different form or is held or fixed expediently elastically movably, preferably in the normal position, between clamping sleeve 3 and partition 16 such that all of the components and the cable plug S are positioned securely and protected in the housing 1. By means of the clamping of the clamping part 5 and the receiving of the cable plug S in or on the front side thereof, a very precise positioning is ensured in the direction of the longitudinal axis and also in the circumferential direction of the plug assembly.

Figure 3:
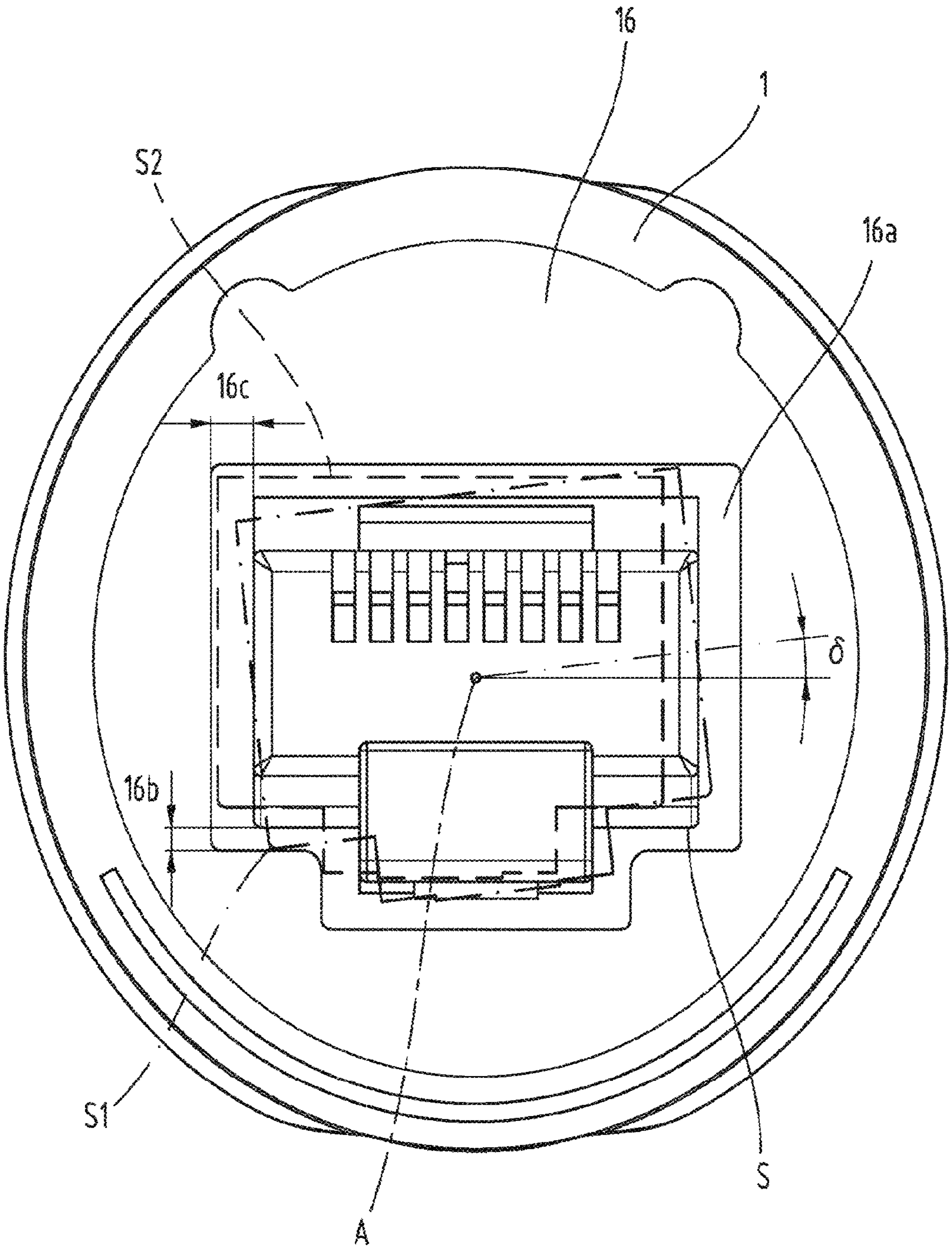
FIG. 3 shows the plug assembly of FIG. 1 in a view from the front, the correct and a twisted position of the cable plug indicated.
Figure 14:
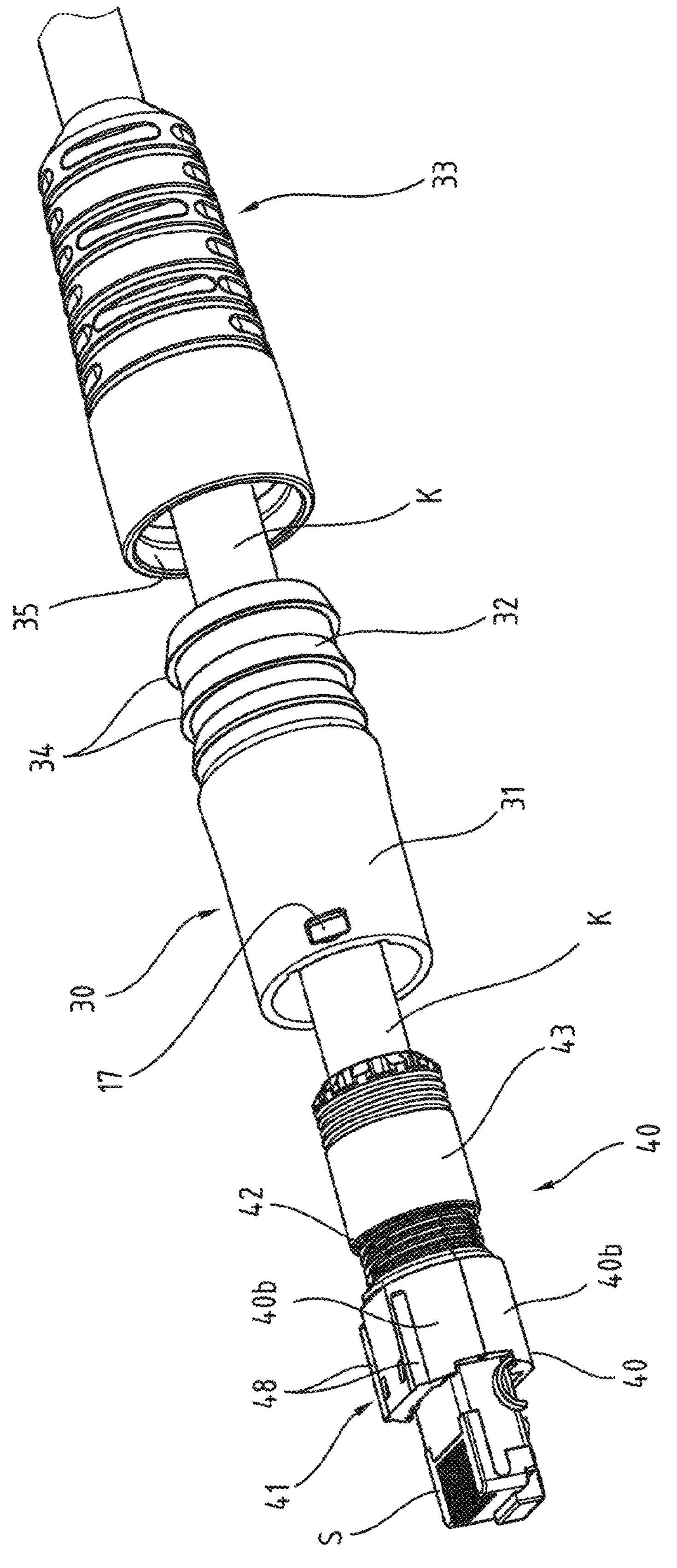
FIG. 14 shows a further embodiment of a plug assembly according to the invention in an exploded illustration.

A cross-sectional constriction or a stop or a group of stops is preferably provided in the housing 1, for example as illustrated in FIG. 3 and FIG. 4 in the form of a pierced partition 16 which forms a stop for the front end of the clamping part 5, the cable plug S or the protrusion 8, if present. The cutout is of such a size or has a contour such that the passage of the front portion of the cable plug or contact carrier S is ensured. At least the two protrusions 8 directly adjoining the longitudinal edge of the longitudinal slot 15 of the clamping part 5 form, with their end faces, the stops for the longitudinal positioning of the clamping part 5 in the housing 1. The front end of the cable plug S projects through the opening in the partition 16, as illustrated in longitudinal section in FIG. 14, said front end projecting forward beyond the end faces of the protrusions 8, 8*a* of the clamping part 5. The opening is formed corresponding to the cross-sectional profile of the cable plug S and is provided if need be with a recess for receiving the front region of the spring arm F of the cable plug S. Its rear region is preferably held in a depressed position by the protrusion 8*a*. The recess in the partition 16 is preferably dimensioned in such a manner that the front end of the protrusion 8*a* can also be received and can reach through the partition 16 in order to securely hold the spring arm F in a depressed position. In this case, the end face of the first shoulder 9 of the protrusion 8*a* is provided as the stop on the partition 16. If need be, the partition 16 could also have a recess extending in the direction of the longitudinal axis for receiving the protrusion 8*a*.

If need be, the function of depressing the spring arm F can also be brought about by a correspondingly dimensioned recess in the partition 16. The partition 16 is arranged within the housing 1 at a longitudinal point which is selected to obtain the desired positioning of the cable plug S in the housing 1 and with respect to the plug socket in order to ensure an optimum plug-in connection. For this case, an embodiment of the clamping part 5 is provided in which there is no long protrusion 8*a* reaching over the spring arm F, but rather all of the protrusions 8 are substantially equal in length.

On the other hand, the elasticity of the material of the clamping part 5 and a small amount of play, i.e. a small clearance 16*a*, between the inner wall of the recess in the partition 16 and the cable plug S afford the possibility that the cable plug S can be pivoted by a small angle δ at least in the direction of at least one of the two main axes of the recess in the partition 16. The intermediate space 16*b* is typically in the range between 0.5 mm and 2 mm. Small tolerances and differences in the alignment of the plug assembly and the counterpart thereof can therefore be compensated for, as a result of which the plugging together of the two complementary assemblies in order to produce the connection between two cable ends or a cable end and an appliance is substantially simplified. These intermediate spaces 16*a* or distances 16*b* and/or 16*c* can if expedient be different in size in different, e.g. opposite, spatial directions, as shown by way of example in FIG. 4.

The plurality of protrusions 8 and 8*a* can be formed at the front end of the clamping part 5, which protrusions are distributed circumferentially about the central longitudinal axis and are oriented parallel thereto and extend from the central part 11 of the clamping part 5 to the insertion end of the housing 1. Preferably, three protrusions 8, 8*a* are formed and extend over up to around one third of the overall length of the clamping part 5. The cable plug S, as is illustrated in FIG. 2, is inserted between the protrusions 8, 8*a* and is then received between the protrusions 8, 8*a* at the latest when the threaded connection of the housing 1 to the clamping sleeve 3 is tightened, and is then, owing to the guidance of the clamping part 5 in the housing 1 and the clamping between the clamping part 5 and within the housing 1, held securely in the plug assembly in a very precisely defined normal position between the housing 1 and the clamping part 5, both with respect to the direction of rotation about the direction of the longitudinal axis and also in the longitudinal direction and/or transverse direction of the plug assembly.

An embodiment in which a clamping part 5 is configured for use with cable plugs S of different external dimensions is particularly preferred. This can be achieved, for example, by the fact that, on at least one of the protrusions 8, 8*a*, at least one shoulder 9 or a step is formed offset in the circumferential direction and in the longitudinal direction of the clamping part 5 as an end-face stop surface for the cable plug S of differently dimensioned cable plugs S. This can clearly be seen in FIG. 5. Here, the cable plug S does not lie directly against the central piece 11 of the clamping part 5, but rather only against the steps 9 of the protrusions 8, 8*a*.

Figure 16:
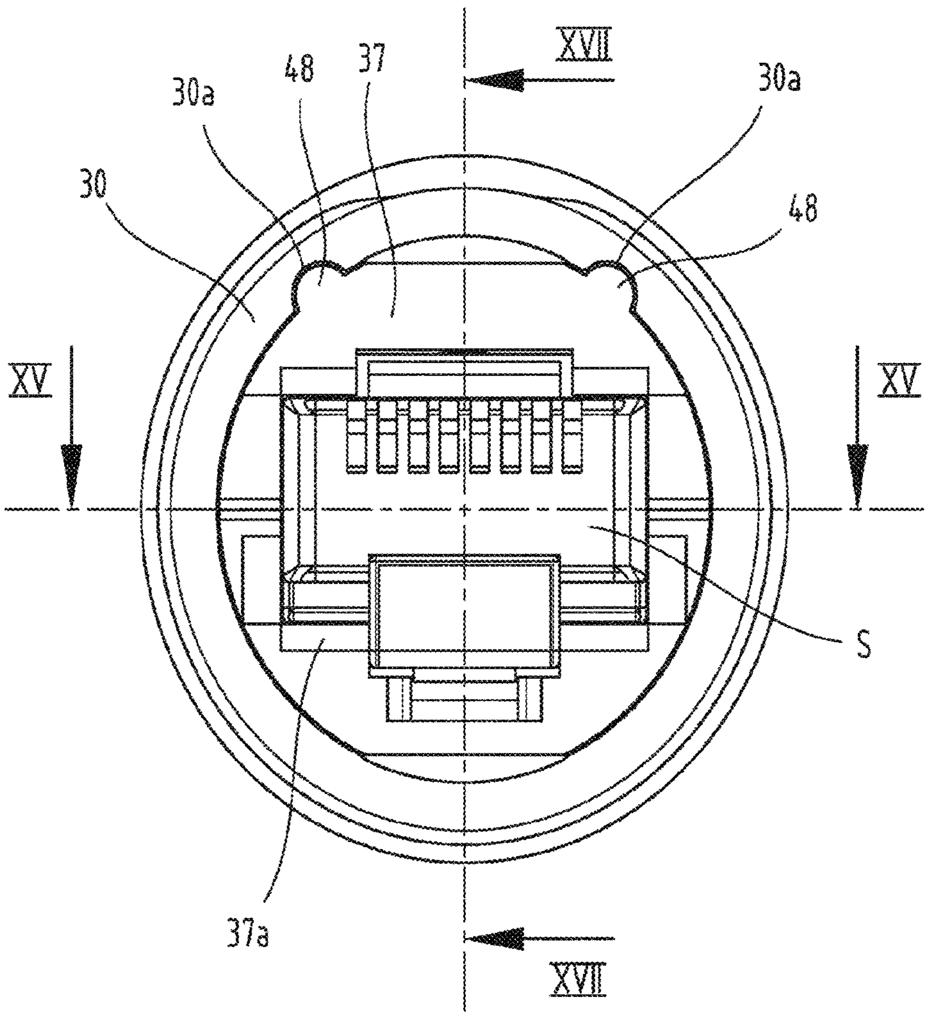
FIG. 16 shows the plug assembly of FIG. 14 in a view from the front.

Preferably, two or else more than two shoulders 9 are provided. The rear side of a cable plug S inserted between the protrusions 8, 8*a* then comes to lie against one of the shoulders 9 depending on the dimensions of the cable plug. This is illustrated for two different cable plugs S in a view from the front in FIGS. 16 and 17. As soon as the clamping sleeve 3 is screwed onto the housing 1 and the threaded connection tightened, the rear end of the cable plug S is then received between the protrusions 8, 8*a*, lies against at least one end surface of one of the shoulders 9 and is therefore securely positioned and fixed within the housing 1. For the secure and precisely defined positioning and also for the guidance of the cable plug S during the insertion into the clamping part 5, cross-sectionally tooth-shaped guide ridges 8*b* are advantageously formed on the protrusions 8, 8*a*, said guide ridges coming into contact with the outer side of the cable plug S and guiding and holding the latter.

In the housing 1 of the plug assembly according to the invention, longitudinal guide grooves 1*b* or longitudinal guide strips can also be formed on that side of the partition 16 which faces the clamping sleeve 3, said longitudinal guide grooves or longitudinal guide strips being aligned with the corner regions of the aperture in the partition 16 and serving for the correct guidance of the cable plug S in the circumferential direction as the latter is inserted into the housing 1. Longitudinal grooves 1*a* on that side of the partition 16 which faces the counterpart of the housing 1 in the plug socket serve primarily for indexing in order to prevent confusion with other, similarly constructed types of plug. They can optionally also serve as guides for the circumferentially correct guiding of them together to produce the plug-in connection.

Latching protrusions (not shown) for fixing the clamping part 5 within the housing 1 can be formed on the end faces of the protrusions 8, 8*a* in order to fix the clamping part 5 in the housing 1 and to secure it against being pulled out or against sliding out. Latching protrusions 11*a*, indicated in FIG. 8, which engage in complementary structures in or on the inside of the housing 1 could also be positioned if need be on the circumferential surface of the clamping part 5, in the region of the protrusions 8, 8*a* or of the central part 11, as is illustrated by way of example in FIG. 5.

The housing 1 can be provided if need be with a longitudinal groove, and the plug socket B, which is installed, for example, as a built-in plug-in connector in an appliance G (see in this respect FIG. 20), can be provided with a corresponding mating longitudinal rib in order to ensure that the plug assembly is aligned with respect to the plug socket B when the plug assembly is pushed into the plug socket. In order to prevent the unintentional pulling off of the cable plug, a snap latch or spring latch can additionally be provided as an optional further feature for releasably connecting the plug assembly to the plug socket. Said spring latch then preferably engages in a depression 17 on the outside of the housing 1.

The protrusions 8 and 8*a* of the clamping part 5 are preferably kept flexible to a small extent in order to permit a small amount of movability of the cable plug or contact carrier S at the front end of the clamping part 5. It is thus possible, for example, for the cable plug S to be rotated approximately in the circumferential direction about the longitudinal center axis of the housing 1 in order to permit simpler and gentler plugging into a complementary plug-in connector, if the latter, for example due to manufacturing tolerances, should not be aligned precisely flush with the correct position of the cable plug S. FIG. 3 shows the plug assembly of FIG. 1 and FIG. 2 in a view from the front, with the cable plug S being illustrated in the correct position by solid lines, and a twisted position 51 being illustrated by main-dotted lines. Twisting by a maximum of 2 to 10 degrees about the longitudinal center axis is provided here.

The flexibility of the protrusions 8, 8*a* also permits minor displacements of the cable plug in directions perpendicular to the longitudinal center axis of the housing 1. A position S2 of the cable plug S displaced in two orthogonal directions transversely with respect to the longitudinal center axis by distances 16*b* and/or 16*c* is shown by dashed lines in FIG. 3. A displacement transversely with respect to the longitudinal center axis A, whether vertically, horizontally or in any oblique direction, can be, for example, 2 to 6 mm, at most 1 to 2 mm, at most also only 0.5 mm.

Protrusions 8, 8*a* of the clamping part 5 exert a predefined holding force on the cable plug S. If a radial force component which goes beyond said holding force occurs with the resulting forces with a not precisely aligned insertion within the course of the production of the plug-in connection, the protrusions 8, 8*a* can be deflected out of the normal position in order thereby to permit the deflection of the cable plug S or the cable plugs or contact carriers in both plug assemblies of a plug-in connection in order to protect all of the components. The inner wall of the housing 1 or corresponding protrusions or recesses can constitute an end stop for the deflection movement of the protrusions 8, 8*a*.

The vertical sectional view of FIG. 4 shows the plug assembly of FIGS. 1 to 3 in a completely assembled stated and with the threaded connection of the housing 1 to the clamping sleeve 3 tightened. It is illustrated here that the structures for positioning the cable plug S within the housing 1 also permit tilting of the cable plug S about an axis Q which lies transversely with respect to the longitudinal center axis A of the housing 1 and preferably intersects said axis. The cable plug S is thus illustrated in two tilted positions S3 and S4, with the tilting angles $\alpha$ and $\beta$ typically being between 2 and preferably a maximum of 10 degrees, if need be also differently when tilted upward or downward. The same values also apply to the deflectability of the protrusions 8, 8*a*.

Figure 5:
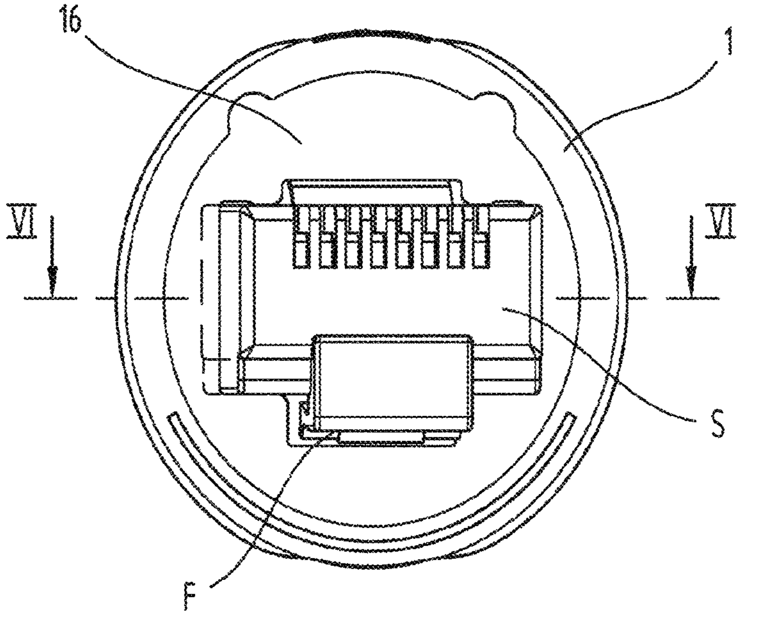
FIG. 5 shows the plug assembly of FIG. 1 in a view from the front, with a pivoted position of the cable plug indicated.
Figure 6:
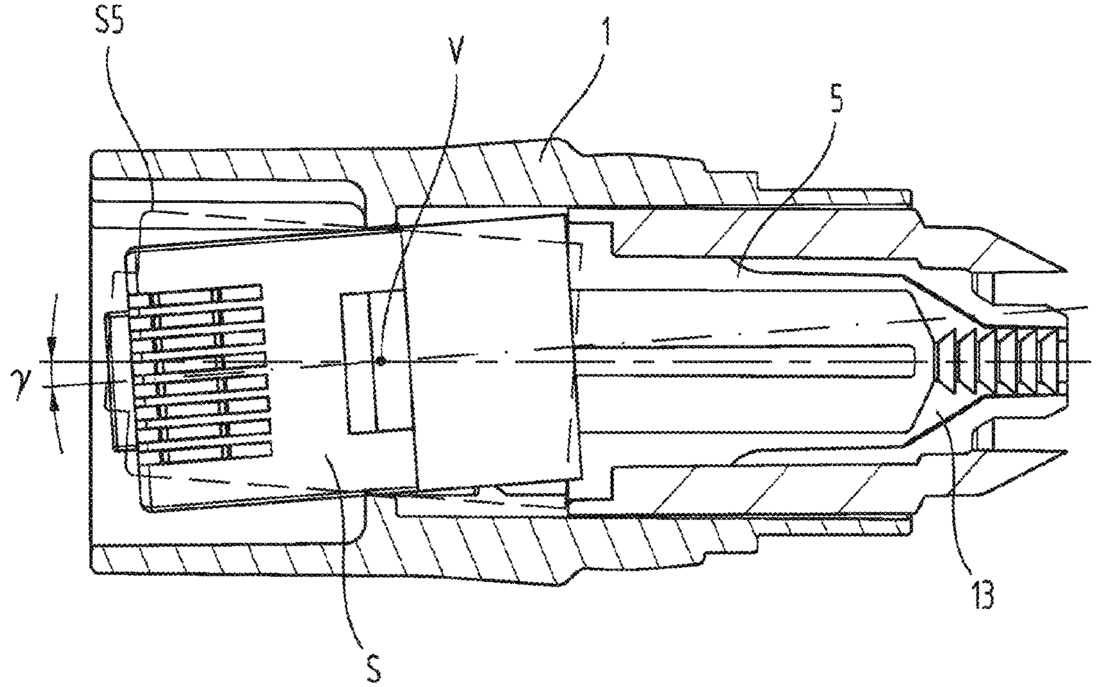
FIG. 6 shows the plug assembly of FIG. 5 in horizontal longitudinal section, with the cable plug in various pivoted positions.

It is illustrated by way of example in FIG. 5, in a view from the front, and in FIG. 6, in a horizontal section through the plug assembly of FIG. 1 to FIG. 3, that pivoting of the cable plug S about a vertical axis V, which is oriented perpendicularly to the longitudinal center axis A and preferably intersects the latter, is also possible by the movability according to the invention of the cable plug S in the housing 1. The cable plug S is depicted in the correct normal position or fitted position by solid lines and in a pivoted position S5 by dashed lines. The angle $\gamma$ of the pivoting is also typically between 2 and preferably at maximum 10 degrees, if need be also differently when pivoting to the left or right. The protrusions 8, 8*a* can also be elastically deflected by the same amount.

Figure 7:
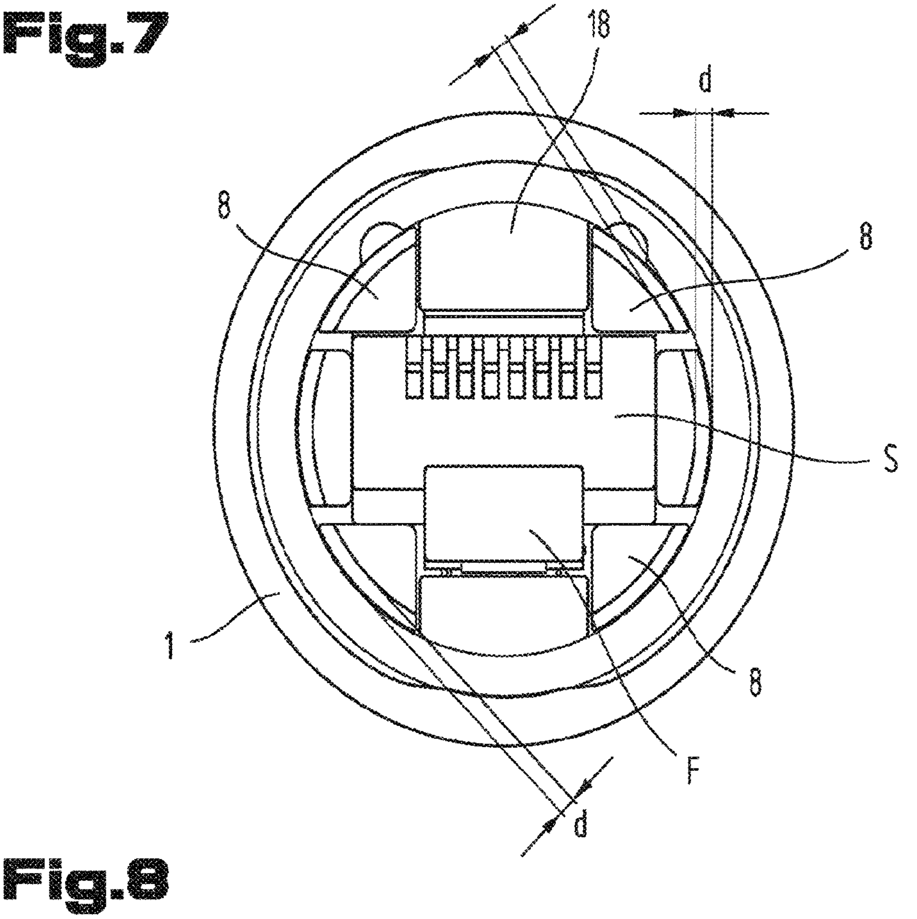
FIG. 7 shows a further embodiment of a plug assembly according to the invention in a view from the front, with the cable plug in a correct position.
Figure 8:
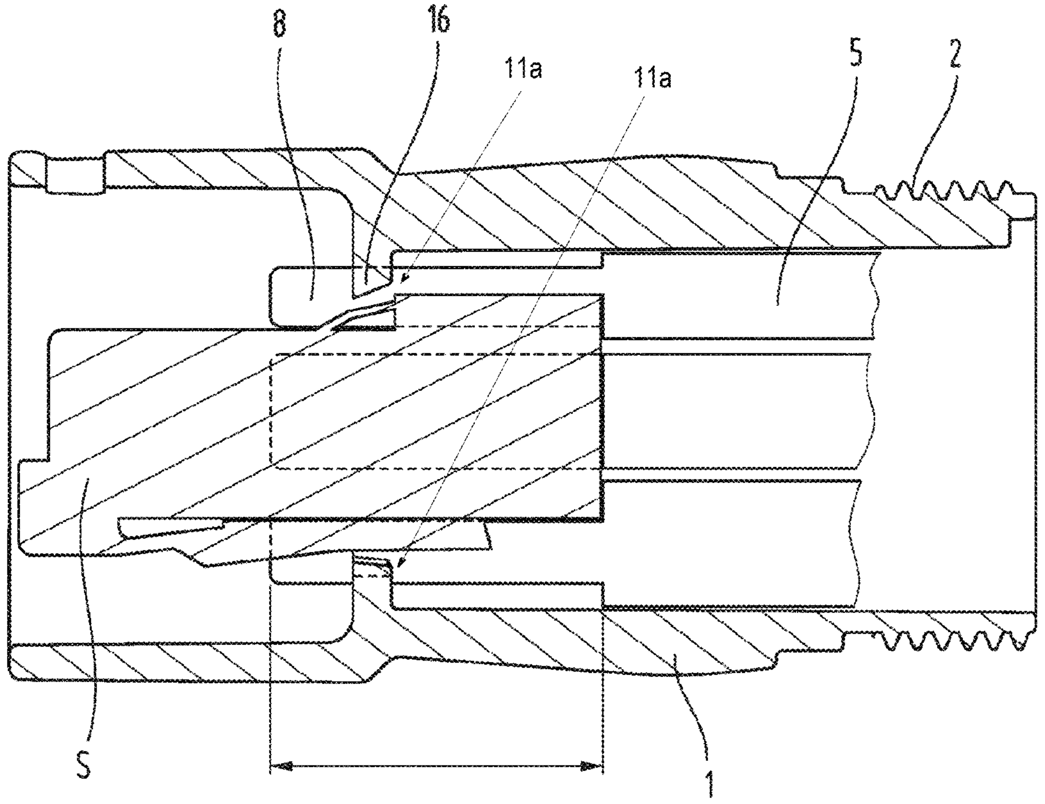
FIG. 8 shows the plug assembly of FIG. 7 in vertical longitudinal section, with the cable plug in various tilting positions.

A further embodiment according to the invention is illustrated in FIGS. 7 and 8. It is provided by way of example here that the protrusions 8, 8*a* of the clamping part 5 project forward into the plug-in-side portion of the housing 1. Instead of a relatively extensive partition 16, as illustrated in FIGS. 3 and 5, the cable plug S or the central portion of the clamping part 5 lies at the front against a stop 18 in order to ensure a front position limit.

Also for embodiments of the housing 1 and of the clamping part 5, in which the protrusions 8, 8*a* end in the interior of the housing 1 and preferably lie against a front stop, for example the partition 16, a certain elastic flexibility of the protrusions 8, 8*a* is of advantage. Said flexibility together with a small amount of play between the cutout in the partition and the portion of the cable plug S held therein contribute to a small amount of movability of the cable plug or contact carrier S at the front end of the clamping part 5 being possible.

In all cases, it is essential that the outside of the protrusions 8, 8*a* are arranged at a defined distance d from the inner wall of the housing 1 (see in this respect FIG. 7 in which this is shown by way of example) and can be deflected radially outward if the cable plug S is tilted, pivoted or displaced in parallel out of its normal position oriented in the direction of the longitudinal axis. Above-explained flexibility of the protrusions 8, 8*a* and/or the play between cable plug or contact carrier S and stops, partition or similar elements which come into contact in a limiting manner with the cable plug or the contact carrier S can also result in a small amount of rotation about the longitudinal center axis.

Figure 12:
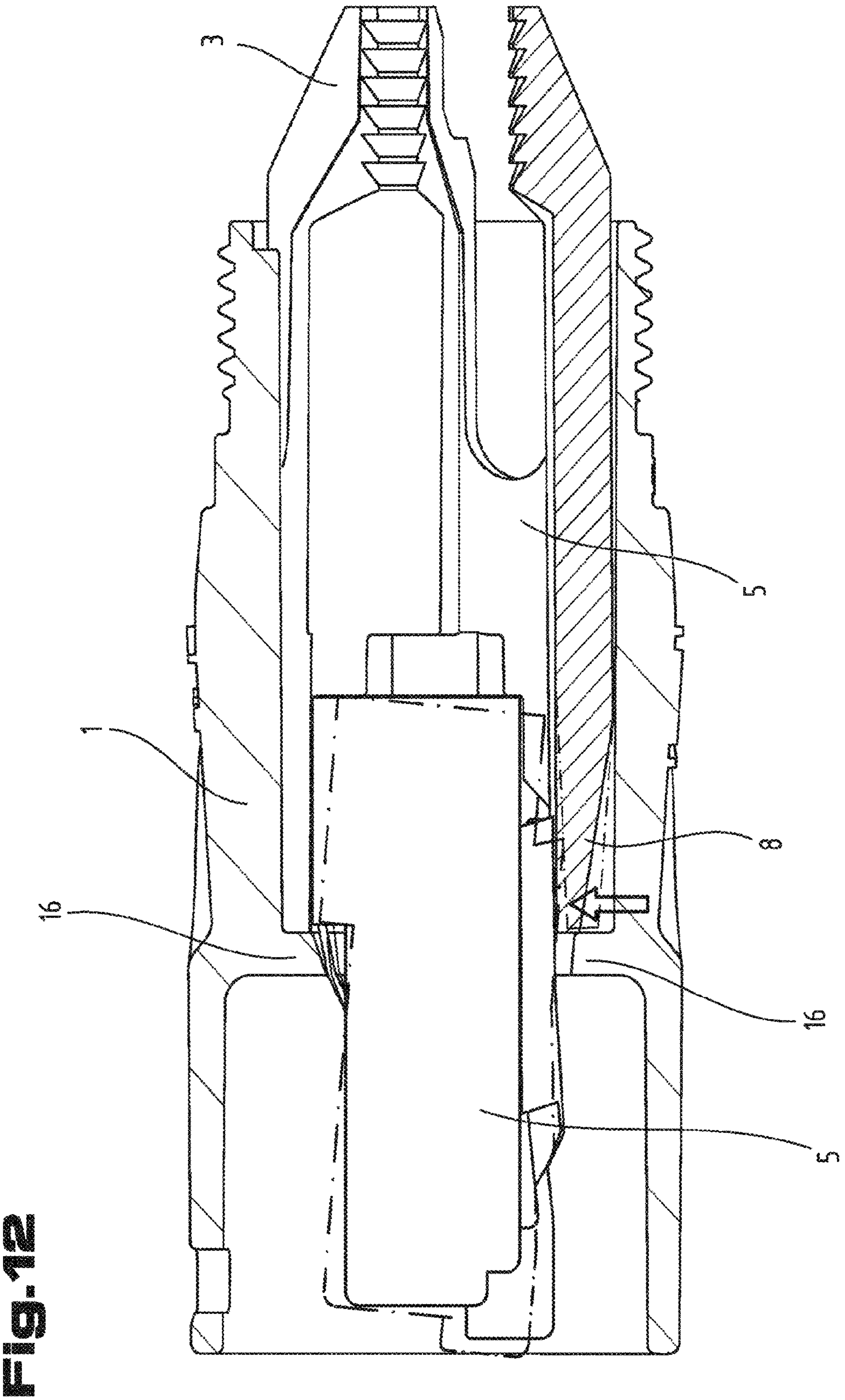
FIG. 12 shows a further embodiment of a plug assembly according to the invention in vertical longitudinal section, with the cable plug in various tilting positions.

In order to permit the deflection of the protrusions 8, 8*a* of the clamping part 5 in the event of the pivoting, tilting, displacement or circumferential rotation of the cable plug S or to permit a deflection to a greater extent, the protrusions 8, 8*a* can be shaped to become narrower toward the front. Such an embodiment according to the invention of a plug assembly is illustrated in FIG. 12.

Small tolerances and differences in the orientation of the plug assembly and of the counterpart thereof can therefore be compensated for, as a result of which the plugging together of the two complementary assemblies in order to produce the connection between two cable ends or a cable end and an appliance is substantially simplified. The risk of damage during plugging of the cable plug into a corresponding plug socket, while the cable plug is inserted in the plug socket and as same is being pulled out of the plug socket can thus be very substantially avoided or reduced, in particular during frequent use.

Figure 13:
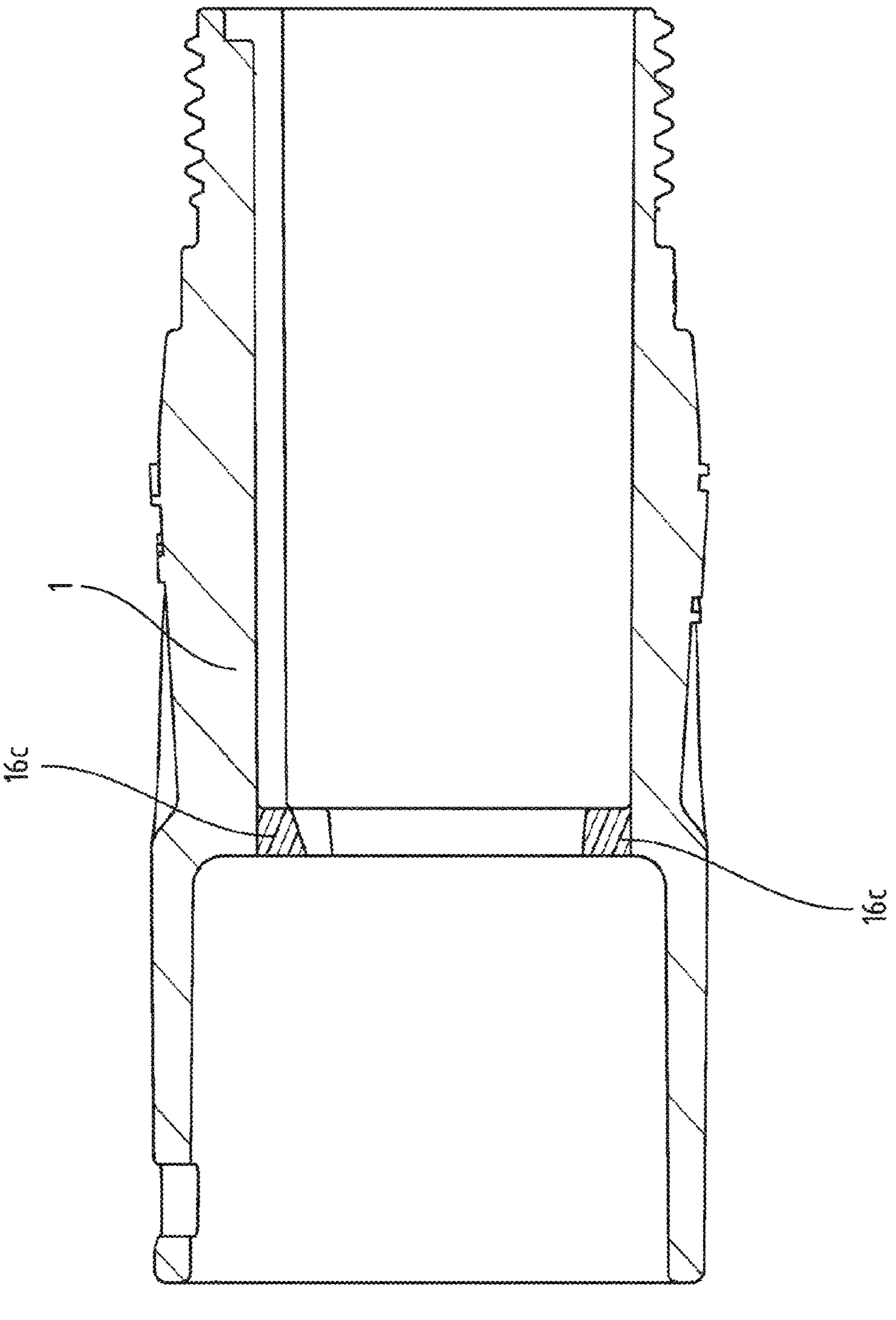
FIG. 13 shows a housing for the plug assembly according to the invention of further embodiment.

The movability according to the invention of the cable plug or contact carrier in the housing 1 could also be obtained, according to a further embodiment of the invention, by the fact that the housing 1, as illustrated by way of example in FIG. 13, is produced from plastic as a co-injection molded part, with a partition 16*c* in the regions facing the cable plug S or contact carrier being more elastic radially in all directions than the rest of the housing 1. The latter therefore continues to maintain its protective effect for the cable plug S or contact carrier. At least one partial region of the housing 1 or of the partition 16*c* forms a fixed stop for the cable plug S or the clamping part 5 in the longitudinal direction or the coupling direction.

Figure 9:
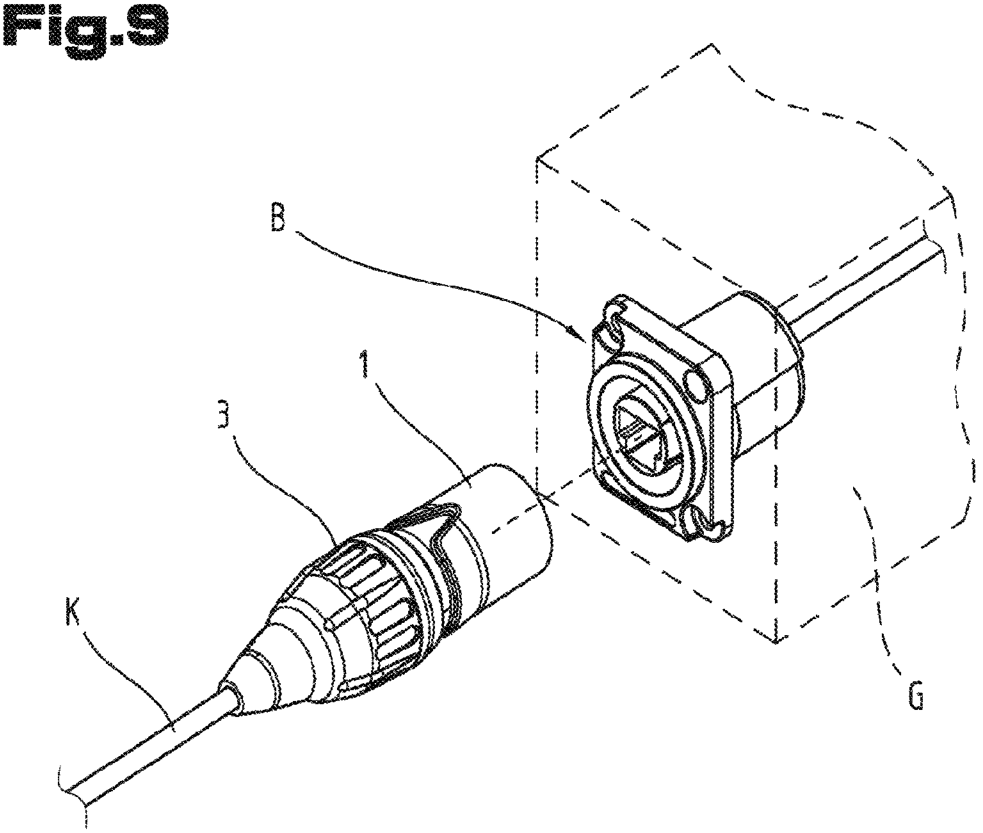
FIG. 9 shows an illustration of a plug-in connection with cable, cable plug according to the invention and complementary plug socket in an appliance.

Using a plug assembly, as described above, a particularly robust plug-in connection can be implemented by a plug socket B being provided for correspondingly receiving the plug assembly 1, 3, 5. Such a connecting arrangement is illustrated by way of example in FIG. 9.

Figure 10:
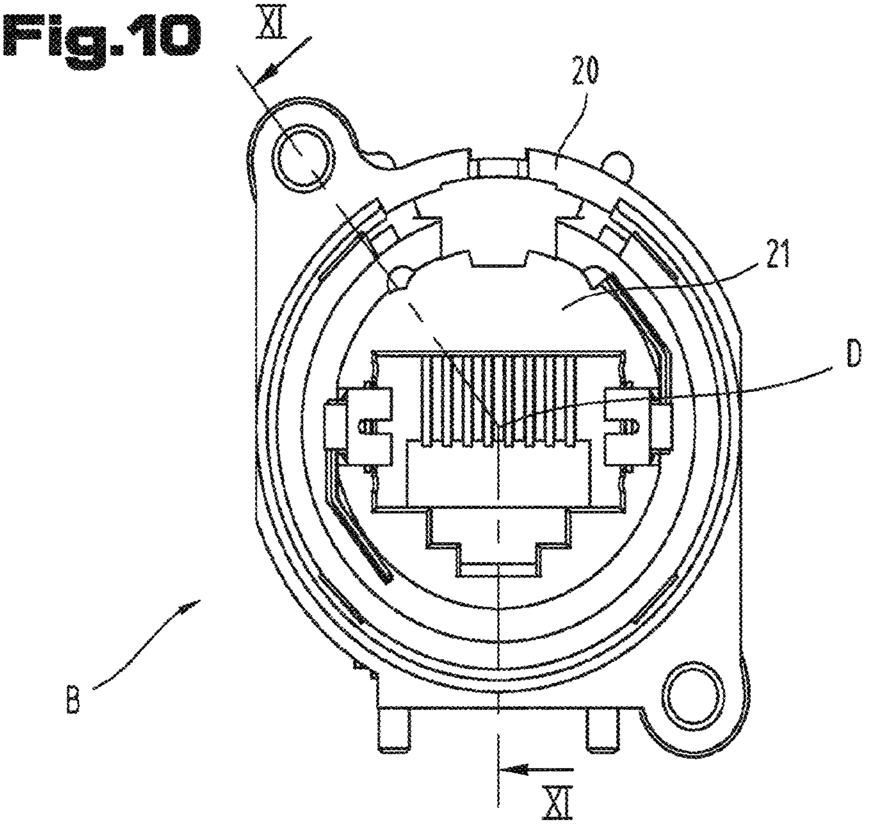
FIG. 10 shows a further embodiment of a plug assembly according to the invention in the form of a chassis socket in a view from the front.

The plug socket B, also referred to as chassis socket, is advantageously likewise constructed in such a manner that even if the contact carrier 21 of the chassis socket B and the cable plug S or the contact carrier of a complementary cable plug are not completely aligned, simple, gentle and easy pushing together and plugging in of the plug-in connection is ensured by the possibility of tilting and/or displacing the contact carrier 21 in a direction transversely with respect to the longitudinal axis of the housing 20 and/or rotation about the longitudinal center axis D of the chassis socket B. An embodiment by way of example is illustrated in FIGS. 10 and 11.

For this purpose, the connecting portion between contact carrier 21 and housing 20 is configured in a manner so as to permit a small amount of movability at least of the front portion of the contact carrier 21 in at least one direction transversely with respect to the longitudinal center axis D of the housing 20. The mechanical loadings on cable plug S, contact carrier 21 and socket B remain small even during repeated plugging in and unplugging, and therefore malfunctions or damage to said components can be avoided.

For example, the contact carrier could be held in the housing of the chassis socket on an elastic arm or on a plurality of elastic arms 22 which are provided as a connecting portion between housing 20 and contact carrier 21. These arms 22 run substantially radially with respect to the longitudinal center axis and are then, because of their small extent parallel to the longitudinal center axis, advantageously flexible or pivotable about a small angle. The connecting portion could also be designed as an annular base at that end of the contact carrier 21 which lies opposite the plug-in side and which permits a relative movement between housing 20 and contact carrier 21 because of the geometrical configuration and/or material thickness or choice of material. This could be achieved, for example, as in the case of the housing 1 of FIG. 13 by the fact that the chassis socket B is produced from plastic as a co-injection molded part, with the arms 22 or an annular base being more elastic than the housing 20 and the contact carrier 21. The housing 20 and/or the contact carrier 21 could optionally be provided with projecting, conically tapering guide walls in order to further facilitate the plugging-in operation. Between the housing 20 and the contact carrier 21, a sealing ring can be inserted on the base of the annular intermediate space.

Figure 11:
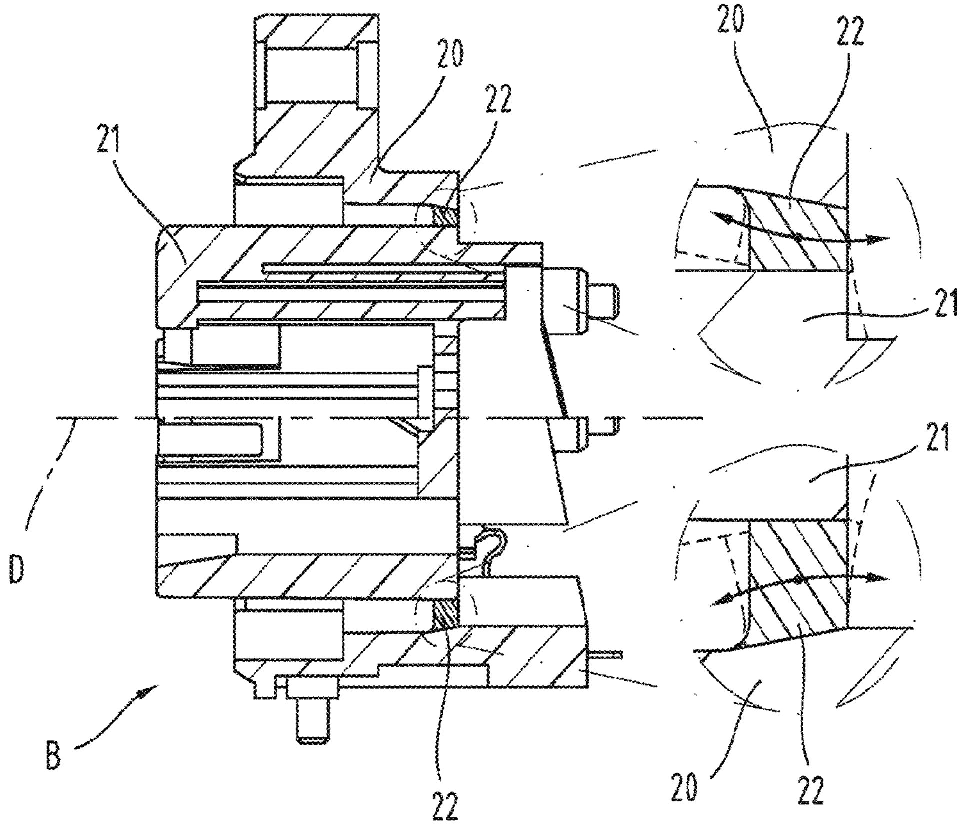
FIG. 11 shows the plug assembly of FIG. 10 in vertical longitudinal section and illustration of a detail on an enlarged scale.

The elastic arm 22, the mobility of which is illustrated in the detailed figures of FIG. 11 on an enlarged scale, holds the contact carrier 21 with a predefined holding force in its correct central position or normal position in which its longitudinal center axis coincides with the longitudinal center axis D of the housing 20. If because of a not precisely aligned pushing in of a complementary plug assembly during the production of the plug-in connection, a radial force component going beyond said holding force occurs because of the resulting forces, the contact carrier 21 can be deflected in order in this way to couple all of the components as gently as possible.

If, advantageously, the protrusions 8, 8*a* of the clamping part 5 of the plug assembly plugged into the chassis socket B are designed to be flexibly elastic, the restoring forces of the interconnected plug assemblies ensure that cable plugs S or contact carriers 21 of the two plug assemblies of the plug-in connection are aligned as best as possible with respect to one another, preferably are inserted one inside another with their longitudinal center axes in alignment.

FIGS. 14 to 17 illustrate a further advantageous embodiment of a plug assembly according to the invention. The latter, as in the embodiments explained up to now, is also provided for use with cables K with cable plugs S, as is explained using the illustrated example of a data cable K with an RJ45 cable plug S.

A housing 30 is provided for protected receiving of the cable plug S or else a pure contact carrier, wherein a front portion 31 of the housing 30 surrounds at least the front portion of the cable plug S at a distance. The rear portion of the housing 30 is connected to a kink protector 33 which surrounds the cable K which is guided outward through the rear end of the kink protector 33.

To preferably releasably connect kink protector 33 and housing 30, at least one peripheral, preferably forwardly oriented latching edge 34 is formed on the outside of the rear portion of the housing 30, and the inside of the front portion of the kink protector 33, which is preferably expandable radially elastically, is provided with corresponding peripheral grooves 45. Of course, other types of connection are also conceivable, and are preferably producible without use of a tool, like the specifically described latch/groove connection, for example threaded connections or bayonet connections.

The cable plug S is received protected in the interior of the front portion of the housing 30 and, for defined positioning, lies against the front portion 41 of a clamping part 40 or is partly plugged therein by a rear portion of the cable plug S. The clamping part 40 is preferably composed of two half shells 40*a*, 40*b* which extend in the longitudinal direction of the cable K and lie parallel to both sides of the cable and which are preferably interconnected pivotably at the front end of the front portion 41 and are thus linked together. At the rear end of the clamping part 40 there is arranged an external thread 42 onto which a clamping sleeve 43 provided with a corresponding internal thread can be screwed in order to interconnect clamping part 40 and clamping sleeve 43 and at least to radially compress the rear portion of the clamping part 40, that portion with the external thread 42. As a result, the cable K is clamped at least to the rear portion of the clamping part.

For this purpose, the rear ends 44 of the clamping part 40, i.e. the rear ends of the two half shells 40*a*, 40*b*, are configured on the surfaces facing the cable K for an increased form fit or frictional fit with the cable K. For example, these surfaces can be profiled in the manner of serrations such that, when the rear end 44 is compressed during the tightening of the threaded connection between clamping part 40 and clamping sleeve 43, the points of the serrations press into the plastics sheath of the cable and thus bring about the clamping between cable K and clamping part 40. As a result, tensile stresses of the cable K are separated from the cable plug S and instead transmitted further via the clamping part 40 to the housing 30 and absorbed by the latter or by the plug-in connection between housing 30 and the counterpart of the second plug-in connector of the plug-in connection.

For this purpose, the front end of the front portion 41 of the clamping part 40, which front end faces the cable plug S, is correspondingly designed for receiving and positioning the cable plug S in a predetermined normal position, preferably is provided with a receiving opening corresponding to the rear side of the plug housing H, or with at least one stop for the cable plug S. If need be, protrusions similarly to the above-explained embodiments for the clamping parts 5 used there can also be present. The clamping part 40 can again preferably be produced from polyacetal (POM) or else polyamide (PA). All of the embodiments of the plug assembly described above in conjunction with the clamping part 5 apply in the same way or at least analogously, therefore repetition of the features explained there is dispensed with here.

A particularly preferred embodiment of the clamping part 40 makes provision that the contact region with the cable plug S is configured so as to permit a small amount of movability at least of a portion of the cable plug S in at least one direction transversely with respect to the direction of the longitudinal axis of the housing 30. A further embodiment of a plug assembly according to the invention acts in a functionally identical way in which a distance to an extent or a distance 16*b*, 16*c* is kept free between the outside of the clamping part 40 and the inside of the housing 30 in order to permit a small amount of movability at least of the front end of the clamping part 40 in at least one direction transversely with respect to the direction of the longitudinal axis of the housing 30. The embodiment provides only for as precise a positioning as possible of the clamping part 40 and/or of the cable plug S in the direction of the longitudinal axis or plugging-in direction in order to ensure the correct contact connection when the plug-in connection is fully connected.

Figure 15:
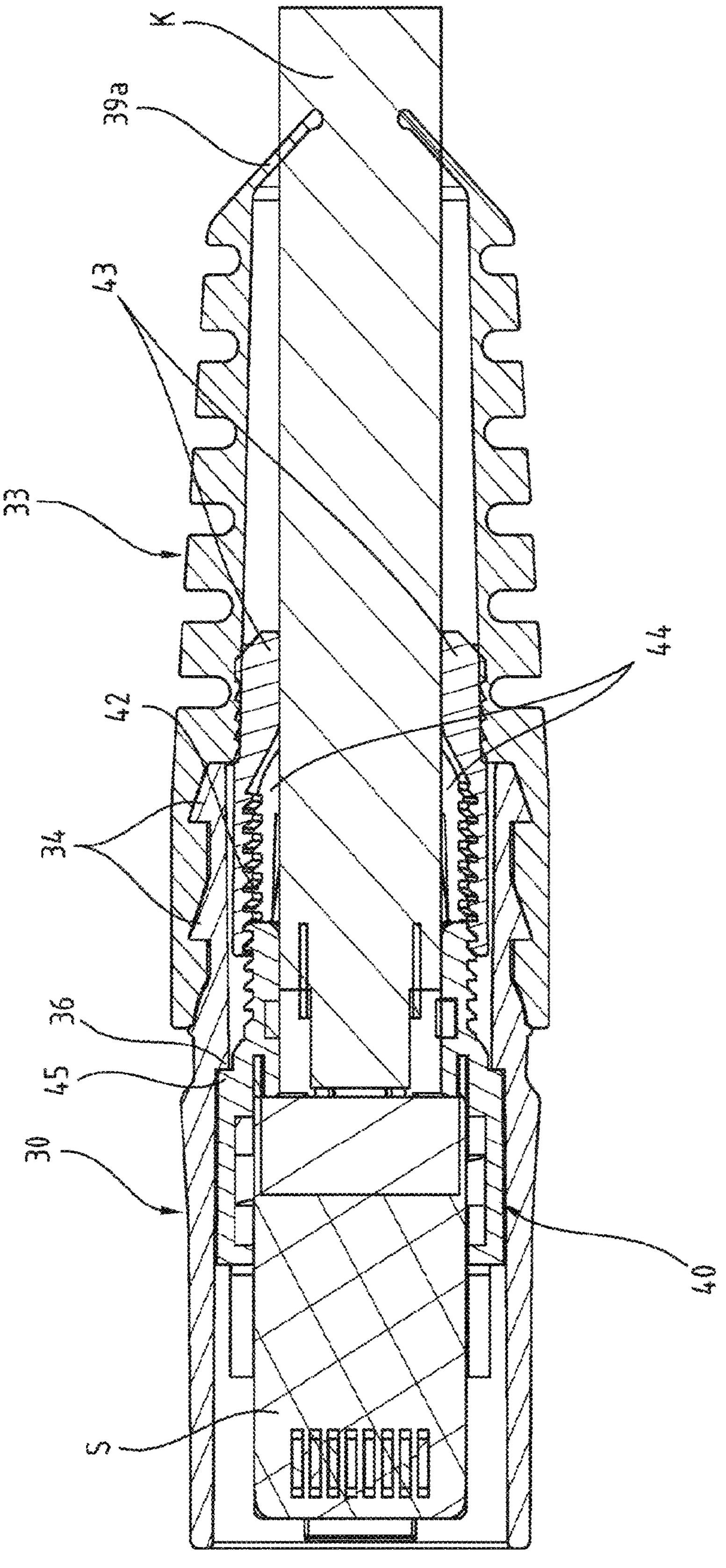
FIG. 15 shows the plug assembly of FIG. 13 in horizontal cross section.

One possible embodiment which ensures this positioning in the longitudinal direction but permits a small amount of movability of the clamping part or of the cable plug or contact carrier S in at least one direction transversely with respect to the direction of the longitudinal axis of the housing 30 provides a cross-sectional constriction 36 on the inside of the housing 30, as illustrated in FIG. 15. This can be at least one protrusion which rises over the inner wall of the housing 30, but it could also be a group of protrusions or a cross-sectional constriction 36 over the entire extent of the housing 30, preferably at the transition between the front portion of the housing 30 and the rear portion to which the kink protector 33 is connected. The cable plug S or the clamping part 40 comes into contact against said cross-sectional construction 36 from the front, as a result of which the movement of the cable plug S or of the clamping part 40 further to the rear, i.e. in the direction of the kink protector 33 is limited. According to an advantageous embodiment, a rearwardly oriented shoulder 45 on the clamping part 40 or else a shoulder on the cable plug S comes to lie against the cross-sectional constriction 36 when the cable plug S is pushed sufficiently far into the housing 30. Via this arrangement of shoulder 45 and cross-sectional constriction 36 as a front stop, the plugging-in forces are then transmitted from the housing 30 to the cable plug S when the latter is grasped by the user and is pushed into the complementary plug assembly in order to produce the plug-in connection.

In a similar way as has been explained in conjunction with the other embodiments of the plug assembly regarding the various exemplary embodiments described previously, the cross-sectional constriction can also be formed if need by a pierced partition 37 in the housing 30, which partition is provided with a recess for the front portion of the cable plug S or the clamping part 40 and which then forms a stop for the rear end of the cable plug S and/or a rearwardly directed shoulder or a corresponding protrusion on the clamping part 40. In this case, a small amount of movability of the cable plug S relative to the housing 30 is provided by a small intermediate space 37*a* between the inner boundary of the recess in the partition 37 and the cable plug S or the clamping part 40. An embodiment of this type is illustrated in a view from the front in FIG. 16.

Otherwise, the arrangement of cross-sectional constriction 36 and preferably the shoulder 45 of the clamping part 40 permits the clamping part 40 to be pushed together with the cable plug S or the contact carrier forwards out of the housing 30—i.e. in the plugging-in direction. Normally, said pushing-in or pulling-out of the housing 30 from the clamping part 40 to the rear, onto the portion of the cable K actually lying behind the kink protector 33, is prevented by a latching connection and can be brought about only by release thereof.

Figure 17:
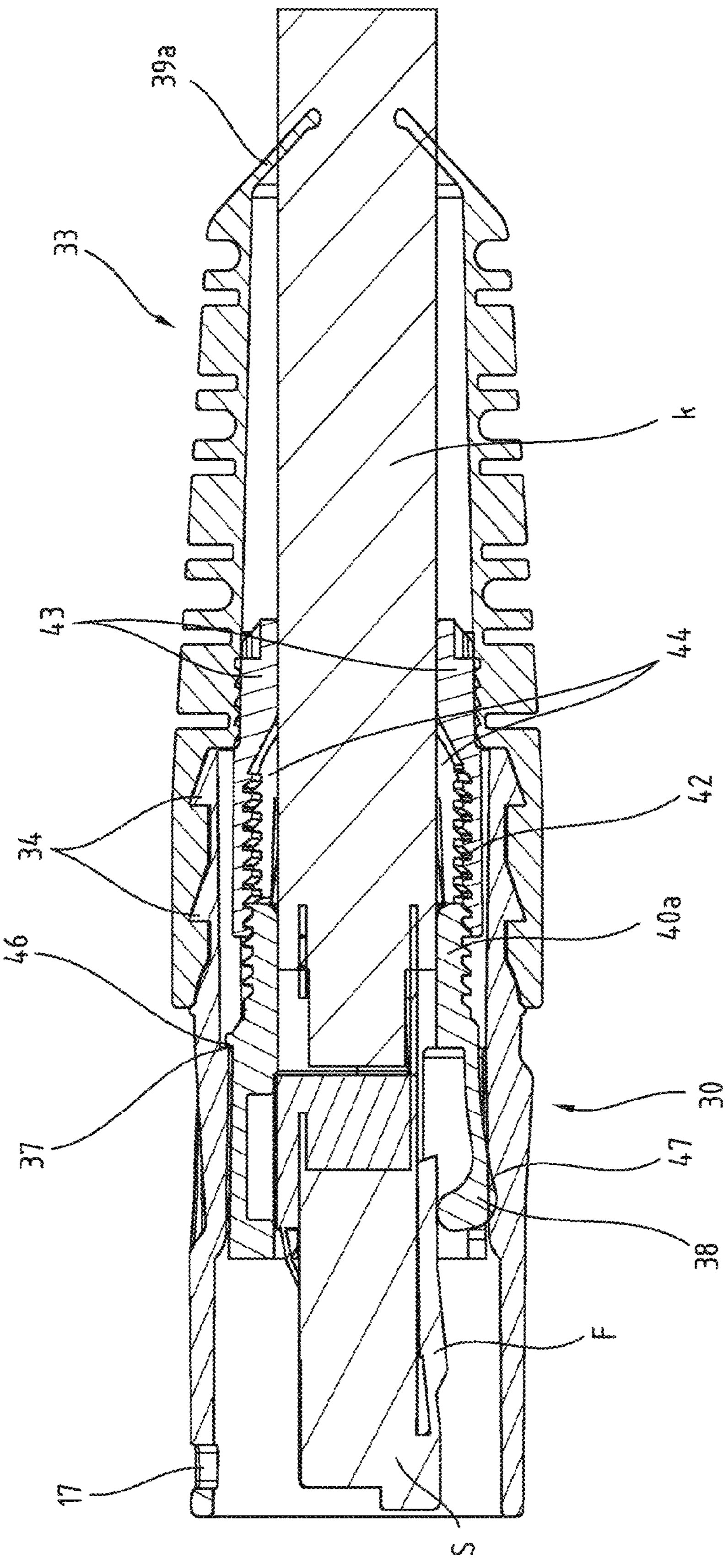
FIG. 17 shows the plug assembly of FIG. 14 in vertical cross section.

This latching connection is preferably arranged in the front portion of the housing 30. In a preferred example which is illustrated in FIG. 17, it consists of a protrusion on the clamping part 40, preferably a transverse ridge 46, which runs transversely with respect to the longitudinal center axis of the clamping part 40, on a surface of the clamping part 40 and a rearwardly directed step 38 on the inside of the housing 30. If need be, the transverse ridge could also be arranged on the cable plug or contact carrier S. The step 38 on the inside of the housing 30 and the transverse ridge 46 of the clamping part 40 or of the cable plug S are configured in a complementary manner with respect to each other and, in a latched position, the step 38 is positioned in front of the transverse ridge 46, i.e. closer to the open end of the housing 30 than the transverse ridge 46.

On that side of the clamping part 40 which lies opposite the transverse ridge 46 with respect to the cable K or the longitudinal center axis, said clamping part has a spring element, for example a spring arm 39 configured similarly to the spring arm F of the cable plug S. Said spring arm 39 acts upon the cable plug S or the clamping part 40 with a force in the direction of the step 38, as a result of which step 38 and transverse ridge 46 are held in a latched position. In an advantageous embodiment, the spring arm 39 lies with a rounded outer contour in a correspondingly shaped depression 47 on the inside of the housing 30 and thus additionally contributes to the locking between housing 30 and clamping part 40.

To release the plug-in connection, the housing 30 can be grasped and pulled off from the complementary plug assembly, the force necessary for pulling off the cable plug S being transmitted via the latching connection between step 38 and transverse ridge 46 from the housing 30 to the cable plug S.

In order to release the latching connection, the cable plug S is pressed downwards counter to the force of the spring arm 39 in the housing 30, as a result of which the transverse ridge 47 on the clamping part 40 is disengaged from the step 38 of the housing 30 and the two parts can now be displaced relative to one another in the direction of the longitudinal axis. The housing 30 and the kink protector 33 can then be pushed rearward along the cable K, as a result of which the cable plug S and the clamping part 40 are no longer covered by the housing 30. In this state, the cable plug S can then be used for producing plug-in connections which would not be possible with the housing 30, i.e. with other plug assemblies which, although designed to match the actual cable plug S, are not shaped in a complementary way with respect to the housing 30.

Preferably, the rear end 33*a* which narrowly encloses the cable K is formed elastically and has a smaller inside diameter than the cable K. The arrangement of housing 30 and kink protector 33 in a position pulled off from the clamping part 40 is nevertheless held in a fixed position on the cable K and cannot slip independently on the cable K.

In order to ensure the correct relative position of clamping part 40 and housing 30 when the clamping part 40 is pushed with the cable plug S into the interior of the housing 30, guides 30*a* running parallel to the direction of the longitudinal axis of the housing 30 are advantageously formed in the frontmost portion on the inside of the housing 30, in which guides complementary guide structures 48 on the outside of the clamping part 40 or else of the cable plug S engage and thus ensure the correct position with respect to the circumferential direction. This arrangement for the correct guidance of the clamping part 40 or of the cable plug S is preferably also designed to permit a small amount of movability of the clamping part 40 in at least one direction transversely with respect to the direction of the longitudinal axis of the housing 30. Preferably, the guide structure 48 on the clamping part 40 is configured as a ridge running parallel to the direction of the longitudinal axis of the clamping part 40 and the guide 30*a* on the housing 30 is configured as a depression or groove running parallel to the direction of the longitudinal axis of the housing 30.

All of the variants described previously in the various exemplary embodiments can be combined with one another as desired. In particular, all of the details disclosed for the flexible holding of the cable plug S can be used and combined as desired in any of the exemplary embodiments. This is true especially of the embodiments of the flexible holder that are described in FIGS. 1 to 13 and can equally also be realized in the exemplary embodiment according to FIGS. 14 to 17.

With regard to the construction of the plug assembly, the individual elements thereof and in particular the features in conjunction with the clamping part, reference is made to the application WO2019/192753 A1, the contents of which are hereby incorporated in this application.

The exemplary embodiments and the preceding description and the attached drawings disclose possible embodiment variants, but the invention is not restricted to the specifically illustrated embodiment variants. On the contrary, diverse combinations of the individual embodiment variants with one another are also possible, owing to the teaching of this invention, these variation possibilities lie within the ability of a person skilled in the art active in this technical field.

LIST OF REFERENCE SIGNS

1 Housing
1*a* Longitudinal groove
1*b* Guide groove
2 External thread
3 Clamping sleeve
4 Internal thread
5 Clamping part
6 Guide groove
8 Front protrusion
8*a* Spring arm protrusion
8*b* Ridge
9 Shoulder
10 Ridge
11 Central part
11*a* Latching protrusion
12 Conical rear end
13 Rear extension
14 Serration structure
15 Longitudinal groove
16 Partition
16*a* Recess
16*b* Intermediate space
16*c* Elastic partition
17 Depression
18 Front stop
20 Housing
21 Contact carrier
22 Connecting portion
30 Housing
30*a* Guide groove
31 Front portion
32 Rear portion
33 Kink protector
34 Latching edge
35 Latching groove
36 Cross-sectional constriction

37 Partition
37*a* Intermediate space
38 Step
39 Spring arm
40 Clamping part
40*a* Half shell
40*b* Half shell
41 Front portion
42 External thread
43 Clamping sleeve
44 Rear end
45 Shoulder
46 Transverse ridge
47 Depression
48 Guide ridge
A Longitudinal center axis of housing
K Cable
S Cable plug/contact carrier
C Contacts
H Housing
F Spring arm
B Appliance socket
G Appliance
Q Transverse axis
V Vertical axis
D Longitudinal center axis of socket
α Tilting angle downward
β Tilting angle upward
γ Pivoting angle
δ Angle in circumferential direction

The invention claimed is:

1. A plug assembly for use with cables with cable plugs, the plug assembly comprising:

a housing for protected receiving of the cable plug, wherein a front portion of the housing surrounds a front portion of the cable plug at a distance;

a kink protector (33) which is connected to the housing at a rear portion thereof;

a cable plug(S) which is fastened to the cable and received in the front portion of the housing;

a clamping part which is radially compressible and engages around the cable (K) and is received in the housing and, in a compressed state, at least with a rear portion clamps the cable;

a front end of the clamping part which faces the cable plug(S) and is designed for receiving and positioning the cable plug in a predetermined position at the front end of the clamping part or is provided with at least one stop for the cable plug;

wherein the cable plug is movably held in the clamping part (40) so as to be movable by a predetermined distance in at least one direction transversely with respect to a direction of a longitudinal axis of the housing, or characterized in that a distance of a predetermined extent is formed between an outer side of the clamping part and an inner side of the housing and at least the front end of the clamping part is movably held so as to be movable in at least one direction transversely with respect to the direction of the longitudinal axis of the housing (30), wherein preferably the front end of the clamping part (40) is arranged so as to be elastically restorable by said distance.

2. The plug assembly as claimed in claim 1, further comprising a clamping sleeve which is connectable to the clamping part (40), preferably to the rear end thereof, preferably by means of a threaded connection in order to radially compress said clamping part.

3. The plug assembly as claimed in claim 1, wherein the clamping part is divided in a longitudinal direction into two half shells (40*a*, 40*b*) which are linked pivotably at the front end and at the rear end have an external thread for connection to an internal thread of a clamping sleeve.

4. The plug assembly as claimed in claim 1, further comprising a cross-sectional constriction on the inner side of the housing as the stop for the cable plug or the clamping part.

5. The plug assembly as claimed in claim 4, further comprising a pierced partition, which is provided with a recess for the front portion of the cable plug or of the clamping part, in the housing as the stop for at least one of the cable plug) and/or the front end of the clamping part, and a small intermediate space (37*a*) of predetermined distance provided between an inner boundary of the recess in the partition and the cable plug or the clamping part.

6. The plug assembly as claimed in claim 1, further comprising a latching connection between the cable plug or the clamping part and the housing (30), preferably arranged in the front portion of the housing (30).

7. The plug assembly as claimed in claim 6, further comprising a rearwardly directed step on an inside of the housing, a transverse ridge, which is configured in a complementary manner thereto and, in a latched position, is arranged behind a shoulder, on the cable plug or on the clamping part, and a spring element for exerting a predetermined force on the cable plug or the clamping part for mutual engagement of shoulder and transverse ridge.

8. The plug assembly as claimed in claim 1, further comprising a kink protector (33) having a rear end (33*a*) which surrounds the cable that is elastic and has a smaller inside diameter than the cable.

9. The plug assembly as claimed in claim 8, wherein the kink protector (33) has an elastic front portion which encloses the rear portion of the housing in at least one of a form-fitting or force-fitting manner.

10. The plug assembly as claimed in claim 1, further comprising at least one guide for at least one of the clamping part (40) and/or the cable plug, which the at least one guide is arranged in a frontmost portion of the housing and runs parallel to the direction of the longitudinal axis of the housing and interacts with a complementary structure on the clamping part, on the cable plug or with the cable plug(S) itself, the at least one guide and/or the guide structure being designed to permit a small amount of movability of the clamping part in at least one direction transversely with respect to the direction of the longitudinal axis of the housing.

11. The plug assembly as claimed in claim 10, wherein the at least one guide includes a guide for the clamping part and the complementary structure on the clamping part that are designed as a ridge running parallel to the direction of a longitudinal axis of the clamping part and as a groove running parallel to the direction of the longitudinal axis of the housing, respectively.

12. A plug assembly for use with cables with cable plugs, the plug assembly comprising:

a housing for protected receiving of the cable plug, a front portion of the housing surrounds a front portion of the cable plug at a distance;

a kink protector connected to the housing at a rear portion thereof;

a cable plug fastened to the cable and received in the front portion of the housing;

a clamping part which is radially compressible and engages around the cable received in the housing (30) and, in a compressed state, at least with a rear portion thereof clamps the cable;

a front end of the clamping part which faces the cable plug is designed for receiving and positioning the cable plug in a predetermined position at the front end of the clamping part or is provided with at least one stop for the cable plug;

a releasable latching connection between the clamping part and the housing, wherein, when releasing the latching connection, the clamping part is disengaged from the housing and the housing and the kink protector are displaceable rearwardly along the cable.

13. The plug assembly as claimed in claim 12, wherein the cable plug is an RJ45 cable plug, and, in a state where the housing and the kink protector are displaced rearwardly along the cable, the cable plug is usable for producing a plug-in connection with a standard RJ45 socket.

14. The plug assembly as claimed in claim 12, wherein the latching connection is releasable by pressing the cable plug downwards in the housing.

15. The plug assembly as claimed in claim 12, further comprising a rearwardly directed step on an inside of the housing, a transverse ridge on the cable plug or on the clamping part, the ridge is configured in a complementary manner to the step and, in a latched position, is arranged behind the step, and a spring element for exerting a predetermined force on the cable plug or the clamping part for mutual engagement of the step and the ridge.

16. The plug assembly as claimed in claim 15, wherein the latching connection is releasable by pressing the cable plug downwards counter to a force of the spring arm in the housing, resulting in the transverse ridge being disengaged from the step.

17. The plug assembly as claimed in claim 12, further comprising a clamping sleeve which is connectable to the clamping part in order to radially compress said clamping part.

18. The plug assembly as claimed in claim 12, wherein the clamping part is divided in a longitudinal direction into two half shells (which are linked pivotably at the front end and at a rear end have an external thread for connection to an internal thread of the clamping sleeve.

19. The plug assembly as claimed in claim 12, wherein the latching connection is arranged in the front portion of the housing.

* * * * *